United States Patent [19]
Seesink et al.

[11] Patent Number: 5,604,685
[45] Date of Patent: Feb. 18, 1997

[54] CIRCUIT ARRANGEMENT FOR THE LINEARIZATION AND TEMPERATURE COMPENSATION OF SENSOR SIGNALS

[76] Inventors: Petrus H. Seesink, Chamonixlaan 210, NL-5627 KE Eindhoven, Netherlands; Georg Schneider, Talstrasse 55, D-79650 Schopfheim, Netherlands; Richard Wagner, Im Hungerich 16, D-79618 Rheinfelden, Netherlands; Vierten M. Mellert, Obertal 22, D-77790 Steinach, Netherlands

[21] Appl. No.: 342,218

[22] Filed: Nov. 18, 1994

[30] Foreign Application Priority Data

Nov. 11, 1994 [EP] European Pat. Off. .............. 94117802

[51] Int. Cl.⁶ .................................................. G01L 19/04
[52] U.S. Cl. ....................... 364/573; 364/571.01; 73/708; 73/766
[58] Field of Search .................... 364/553, 556, 364/557, 558, 482, 573, 571.01, 571.03; 73/708, 718, 724, 765, 766

[56] References Cited

U.S. PATENT DOCUMENTS

| | | | |
|---|---|---|---|
| 4,289,035 | 9/1981 | Lee | 73/708 |
| 4,392,382 | 7/1983 | Myers | 73/708 |
| 4,550,611 | 11/1985 | Czarnocki | 73/708 |
| 4,751,654 | 6/1988 | Lyyra | 364/482 |
| 5,257,210 | 10/1993 | Schneider et al. | 364/553 |

FOREIGN PATENT DOCUMENTS 59-163515  9/1984  Japan.
2277596  11/1994  United Kingdom.

*Primary Examiner*—Gary Chin
*Attorney, Agent, or Firm*—Bose McKinney & Evans

[57] ABSTRACT

A circuit arrangement for the linearization and temperature compensation of capacitive sensor signals is provided which requires few components and wherein the compensated input signal is obtained fast. The arrangement includes: a clock generator; a reference capacitor; a measuring capacitor; a temperature-dependent voltage divider connected between an operating and a reference potential which measures the temperature of the measuring capacitor; an adjusting circuit which acts on the measuring capacitor and the reference capacitor and having a first input connected to the operating potential, a second input connected to the voltage divider, and a third input; an integrating stage connected to the measuring capacitor and the reference capacitor and having its output coupled to the third input of the adjusting circuit, the output being the output of the arrangement. The output signal is $$S = \frac{U \cdot [a_0 + a_1 \cdot v_t + (a_2 + a_3 \cdot v_t) \cdot C_v]}{b_0 + b_1 \cdot C_v},$$

where $C_v=(C_m-C_r)/C_m$, $(C_m-C_r)/(C_m+C_r)$, or $(C_m-C_r)/C_r$; $C_m$ is the capacitance of the capacitor; $C_r$ is the capacitance of the reference capacitor; U is the operating potential; $a_0$ is a zero adjustment value; $a_1$ is a temperature coefficient zero adjustment value; $a_2$ is a first span adjustment value; $a_3$ is a temperature coefficient span adjustment value; $b_0$ is a second span adjustment value; $b_1$ is a linearization adjustment value, and $v_1$ is the temperature-dependent resistance ratio of the voltage divider.

12 Claims, 17 Drawing Sheets

CIRCUIT ARRANGEMENT FOR THE LINEARIZATION AND TEMPERATURE COMPENSATION OF SENSOR SIGNALS

FIELD OF THE INVENTION

The present invention deals with the linearization and temperature compensation of signals from capacitive sensors, since the capacitance of such sensors commonly exhibits a nonlinear dependence on the measurand, such as a pressure, and on temperature.

BACKGROUND OF THE INVENTION

Capacitive sensors are used, for example, as capacitive pressure sensors to measure pressure or as capacitive humidity or moisture sensors to measure humidity or moisture but can also be employed to measure the pressure changes caused by Kármán vortex street in vortex flowmeters.

U.S. Pat. No. 5,257,210 describes comprehensively how erroneous components of the measurand can be linearized and compensated for. The principle of this linearization and compensation consists of first deriving from the measurand an electric signal, hereinafter referred to as "sensor signal", and only then impressing on the sensor signal a disturbance signal generated by a further sensor per disturbance variable.

In the embodiments of U.S. Pat. No. 5,257,210 relating to capacitive pressure sensors with a measuring capacitor and a reference capacitor, therefore, the disturbance signals are processed, together with the sensor signals, only in stages following the measuring and reference capacitors by switched-capacitor quantized charge transport. To accomplish this, several functional units are provided which are controlled by clock signals having a period equal to forty times that of a basic clock signal. The circuitry of the functional units is rather complicated, so that the total number of components required for them is considerable. Also, those forty basic clock signal periods must have elapsed before the prior art arrangement has generated the compensated and desired smoothed output signal.

SUMMARY OF THE INVENTION

It is, therefore, an object of the invention to provide an arrangement which requires substantially fewer components than the prior art arrangement and wherein the compensated smoothed output signal is obtained faster than in the prior art arrangement.

To attain this object, the invention consists in the provision of an arrangement for the linearization and temperature compensation of sensor signals from capacitive sensors which comprises:

a measuring capacitor;

a temperature-dependent voltage divider with a resistive temperature sensor connected between an operating potential and a first reference potential, particularly ground, and measuring the temperature of the measuring capacitor;

a clocked adjusting circuit for the output signal of the arrangement which acts on the measuring capacitor and a reference capacitor by means of analog signals, with a first input of the adjusting circuit connected to the operating potential, and a second input to the temperature sensor;

an integrating stage connectable under clock control to the measuring capacitor and the reference capacitor whose output is connected to a third input of the adjusting circuit and is the output of the arrangement; and a clock generator, with the output signal, S, obeying the following equation:

$$S = \frac{U \cdot [a_0 + a_1 \cdot v_t + (a_2 + a_3 \cdot v_t) \cdot C_V]}{b_0 + b_1 \cdot C_V},$$

where $C_V$ is one of the following capacitance ratios:
$C_{V1} = (C_m - C_r)/C_m$,
$C_{V2} = (C_m - C_r)/(C_m + C_r)$,
$C_{V3} = (C_m - C_r)/C_r$;

$C_m$ is the capacitance of the measuring capacitor;

$C_r$ is the capacitance of the reference capacitor;

U is the operating potential;

$a_0$ is a zero adjustment value;

$a_1$ is a temperature coefficient zero adjustment value;

$a_2$ is a first span adjustment value;

$a_3$ is a temperature coefficient span adjustment value;

$b_0$ is a second span adjustment value;

$b_1$ is a linearization adjustment value, and $v_1$ is the temperature-dependent resistance ratio of the voltage divider.

In a preferred embodiment of the invention, the integrating stage contains a first integrator and a second integrator, the first integrator comprising a capacitor whose polarity must be reversed under clock control, and the second integrator being connectable under clock control to the output of the first integrator.

In another preferred embodiment of the invention, the adjusting circuit comprises:

a first digital-to-analog converter providing a positive converter signal and a negative converter signal, whose reference input is the first input of the adjusting circuit, whose first signal input is supplied with the digitized zero adjustment value, $A_0$, whose second signal input is supplied with the digitized first span adjustment value, $A_2$, and whose first and second signal enable inputs are controlled by the clock generator;

a second digital-to-analog converter providing a positive converter signal and a negative converter signal, whose reference input is the second input of the adjusting circuit, whose first signal input is supplied with the digitized temperature coefficient zero adjustment value, $A_1$, whose second signal input is supplied with the digitized temperature coefficient span adjustment value, $A_3$, and whose first and second signal enable inputs are controlled by the clock generator;

a third digital-to-analog converter providing a positive converter signal and a negative converter signal, whose reference input is the third input of the adjusting circuit, whose first signal input is supplied with the digitized second span adjustment value, $B_0$, whose second signal input is supplied with the digitized linearization adjustment value, $B_1$, and whose first and second signal enable inputs are controlled by the clock generator;

a first summer and a second summer each having one output and six inputs,
  the first and second inputs of the first summer receiving, respectively, the positive and negative converter signals of the third digital-to-analog converter via a first switch and a second switch,
  the first and second inputs of the second summer receiving, respectively, the positive and negative converter signals of the third digital-to-analog converter via a third switch and a fourth switch,
  the third and fourth inputs of the first summer receiving, respectively, the positive and negative converter signals of the first digital-to-analog converter via a fifth switch and a sixth switch,
  the third and fourth inputs of the second summer receiving, respectively, the positive and negative converter signals of the first digital-to-analog converter via a seventh switch and an eighth switch,
  the fifth and sixth inputs of the first summer receiving, respectively, the positive and negative converter signals of the second digital-to-analog converter via a ninth switch and a tenth switch, and
  the fifth and sixth inputs of the second summer receiving, respectively, the positive and negative converter signals of the second digital-to-analog converter via an eleventh switch and a twelfth switch, with
  the output of the first summer and the output of the second summer connected via a 13th switch and a 14th switch, respectively, to the measuring capacitor,
  the output of the first summer and the output of the second summer connected via a 15th switch and a 16th switch, respectively, to the reference capacitor, and
  the respective terminals of the measuring capacitor and reference capacitor remote from the switches connected to the first reference potential.

In a further preferred embodiment of the invention, for the capacitance ratio $C_{V1}=(C_p-C_r)/C_p$ or the capacitance ratio $C_{V2}=(C_p-C_r)/(C_p+C_r)$, the first integrator comprises:
  a first operational amplifier,
    whose inverting input is connected via a 17th switch to the measuring capacitor and via an 18th switch to the reference capacitor,
    with the junction of the 18th switch and the reference capacitor connected via a 19th switch to a second reference potential,
    whose noninverting input is also connected to the second reference potential,
    whose inverting input is connected to the output via three parallel branches,
      the first of which consists of a 20th switch and a 21st switch in series,
      the second of which consists of a 22nd switch and a 23rd switch in series, and
      the third of which consists of a 24th switch,
        with the capacitor connected between the junction of the 20th and 21st switches and the junction of the 22nd and 23rd switches.

In another preferred embodiment of the invention, the second integrator comprises:
  a second operational amplifier
    whose inverting input is connected via a 25th switch to the junction of the 20th and 21st switches and via a fixed capacitor to the output of the arrangement, and
    whose noninverting input is connected to the second reference potential.

If the capacitance ratio $C_{V3}=(C_m-C_r)/C_r$ is used, a 26th switch must be connected between the reference potential and the junction of the 17th switch and the measuring capacitor.

In a further preferred embodiment of the invention, the output of the integrating stage is coupled to a smoothing stage.

In still another preferred embodiment of the invention, to control the 26 switches and the respective signal enable inputs of the three digital-to-analog converters, the clock generator generates, from a basic clock signal, clock signals having a positive level and a more negative level, the respective level occurring during at least one eighth of the period of the basic clock signal.

BRIEF DESCRIPTION OF THE DRAWINGS

Further features and advantages of the invention will become apparent from the following description of embodiments illustrated in the accompanying drawings, in which.

DETAILED DESCRIPTION OF THE INVENTION

Figure 1:
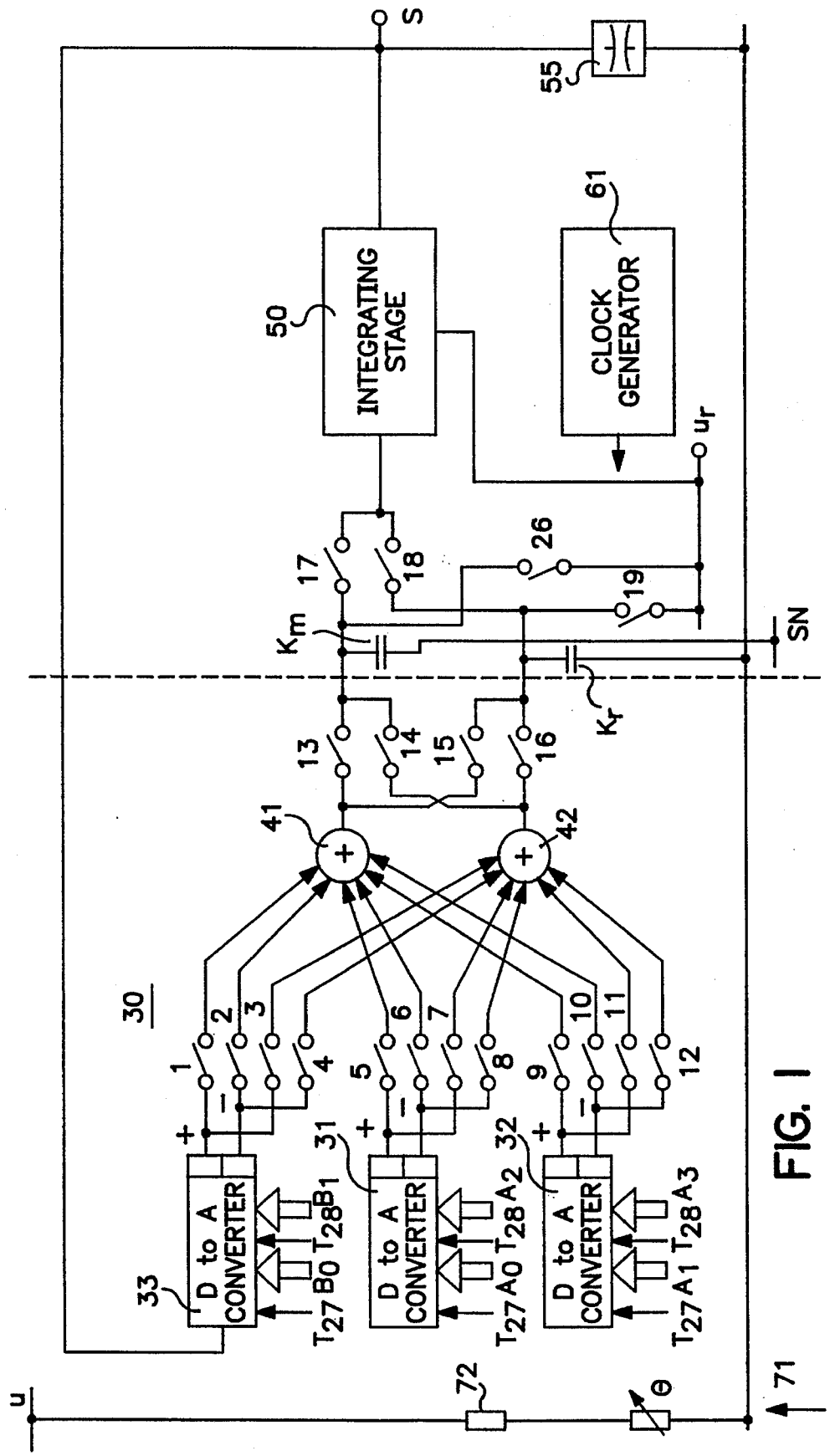
FIG. 1 is a schematic circuit diagram of a first embodiment of the invention.

The schematic circuit diagram of FIG. 1 contains a measuring capacitor $K_m$ of capacitance $C_m$ and a reference capacitor $K_r$ of capacitance $C_r$. In the case of a pressure sensor, the measuring capacitor $K_m$ is pressure-dependent and the reference capacitor $K_r$ is as pressure-independent as possible, with both capacitors preferably implemented within the pressure sensor. The construction of such capacitive pressure sensors is apparent, for example, from FIG. 2 of the above-mentioned U.S. Pat. No. 5,257,210 or from U.S. Pat. No. 5,005,421.

In the case of humidity or moisture sensors with a humidity- or moisture-sensitive measuring capacitor $K_m$, the reference capacitor $K_r$ can be implemented, for example, by making a conventional humidity or moisture sensor humidity- or moisture-insensitive by means of a humidity- or moisture-proof cover layer. In the various cases it is thus advantageous if the reference capacitor $K_r$ is as insensitive to the measurand as possible and can therefore be regarded as constant.

To obtain the compensated analog output signal S, the invention uses one of the three capacitance ratios $$C_{V1}=(C_m-C_r)/C_m$$

$$C_{V2}=(C_m-C_r)/(C_m+C_r)$$

$$C_{V3}=(C_m-C_r)/C_r$$

To generate a signal which is, as exclusively as possible, a measure of the temperature of the sensor, i.e., to generate a temperature-dependent signal, use is made of a voltage divider 71 which is connected between a first reference potential SN of the arrangement and an operating potential U and consists of a resistive temperature sensor $\theta$ of resistance $R_\theta$ and a dropping resistor 72 of resistance $R_{72}$. The temperature-dependent resistance ratio of this voltage divider will be designated $v_t$. Thus, $v_t=R_{74}/(R_\theta+R_{72})$. The tap of the voltage divider 71 thus provides a signal $s=U\cdot v_t = U\cdot R_{74}/(R_{74}+R_{72})$.

The voltage divider 71 is the simplest implementation of a temperature sensor, but the scope of the invention is not limited thereto. If required, any suitable temperature-dependent network can be used. For instance, a temperature-independent resistor could be connected in parallel with the resistive temperature sensor, or a temperature-dependent bridge circuit could be provided.

The first reference potential SN is preferably the potential of the voltage reference point in the arrangement. If that is nor the case, the first reference potential SN may be approximately one half of the value of the operating potential U, for example.

Unlike in the arrangements described in the above-mentioned U.S. Pat. No. 5,257,210, in the invention, an adjusting circuit 30 is provided which acts directly on the measuring capacitor $K_m$ and the reference capacitor $K_r$ to effect linearization and temperature compensation. The analog signals provided by the adjusting circuit 30 are applied directly to the measuring and reference capacitors $K_m$, $K_r$ under clock control. Thus, correction signals are fed to the measuring and reference capacitors $K_m$, $K_r$ so that the output signal S of the arrangement has the desired linear and temperature-compensated waveform.

This direct action on the sensor signal makes it possible in a simple manner to apply, in addition to the signals effecting linearization and temperature compensation, span adjustment signals, zero adjustment signals, etc., as will be explained below.

The adjusting circuit 30 is controlled by clock signals provided by a clock generator 61, see below. A first input of the adjusting circuit 30 is connected to the operating potential U, and a second input is connected to the tap of the temperature-dependent voltage divider 71, i.e., to the junction of temperature sensor $\theta$ and resistor 72.

Connected under clock control to the measuring capacitor $K_m$ and the reference capacitor $K_r$ is an integrating stage 50, whose output is the output of the arrangement and provides the output signal S. This output is coupled to a third input of the adjusting circuit 30.

Figure 3:
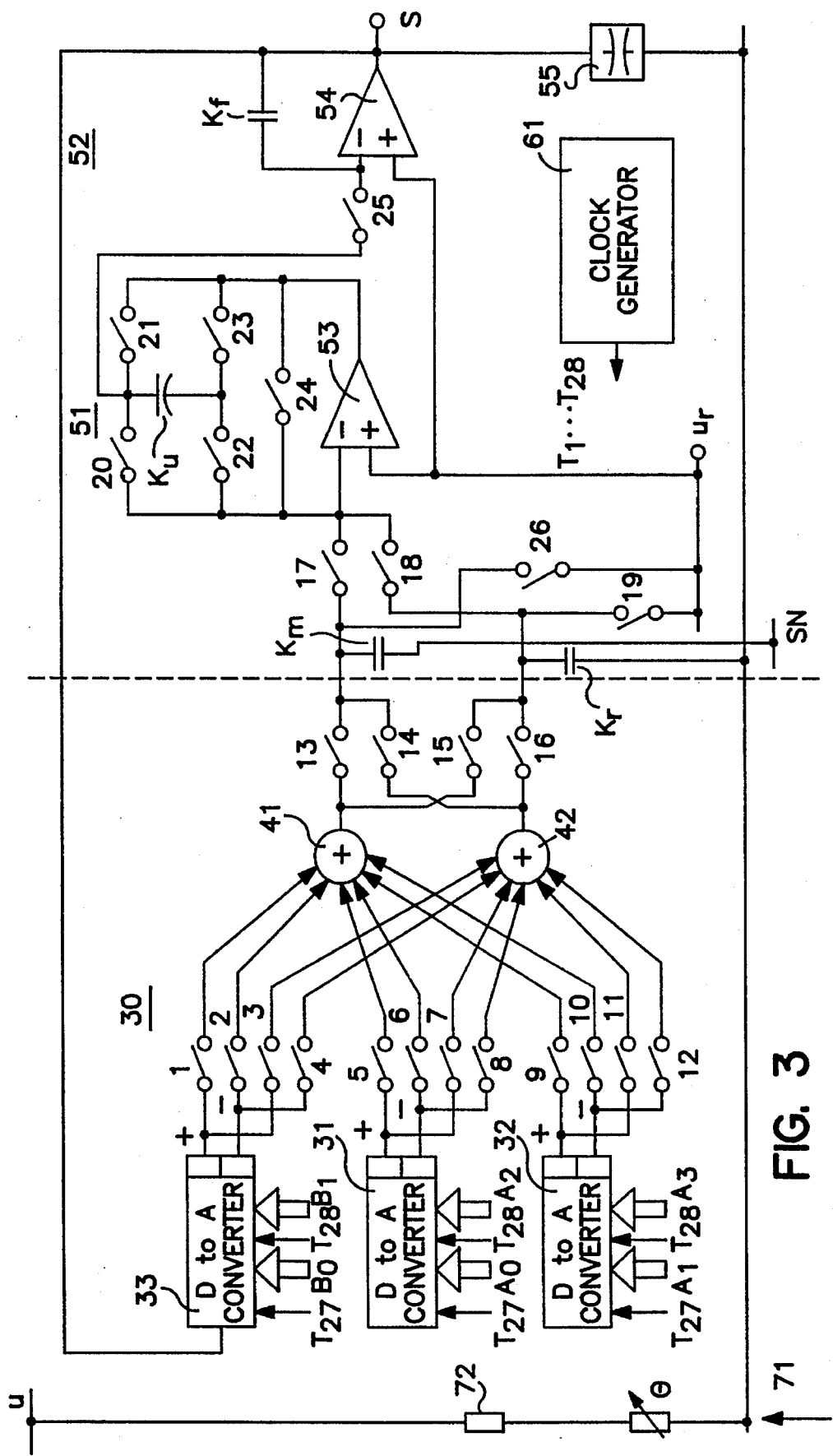
FIG. 3 shows the schematic circuit diagram of FIG. 1 with further advantageous features.

If necessary, the output signal S can be smoothed with a smoothing stage 55, in the simplest case a smoothing capacitor of sufficient capacitance, which must be connected to the output of the integrating stage 50, as can be seen in FIG. 3.

In the invention, the output signal S obeys the following equation:

$$S = \frac{U \cdot [a_0 + a_1 \cdot v_t + (a_2 + a_3 \cdot v_t) \cdot C_v]}{b_0 + b_1 \cdot C_v}$$

where $C_V$ is one of the following capacitance ratios:

$C_{V1}=(C_m-C_r)/C_m$, $C_{V2}=(C_m-C_r)/(C_m+C_r)$, $C_{V3}=(C_m-C_r)/C_r$;

$C_m$ is the capacitance of the measuring capacitor $K_m$;

$C_r$ is the capacitance of the reference capacitor $K_r$;

U is the operating potential;

$a_0$ is a zero adjustment value;

$a_1$ is a temperature coefficient zero adjustment value;

$a_2$ is a first span adjustment value;

$a_3$ is a temperature coefficient span adjustment value;

$b_0$ is a second span adjustment value;

$b_1$ is a linearization adjustment value, and $v_t$ is the temperature-dependent resistance ratio of the voltage divider 71.

The adjusting circuit 30 comprises first, second, and third digital-to-analog converters 31, 32, and 33, respectively, each of which provides a positive converter signal and a negative converter signal. The two converter signals are equal in magnitude relative to the first reference potential SN. The respective negative converter signal can be derived, for example, from the associated positive converter signal by means of an analog multiplier that multiplies by a factor of $-1$.

The respective digital-signal inputs of the three digital-to-analog converters 31, 32, 33 are supplied with digital signals $A_0$, $A_1$, $A_2$, $A_3$, $B_0$, $B_1$, which are formed from the above-mentioned adjustment values $a_0$, $a_1$, $a_2$, $a_3$, $b_0$, $b_1$, for example, and may come, for example, from an electronic memory, such as an EEPROM, in which they were stored. It is also possible, however, to form digital signals with the digital values corresponding to the analog adjustment values $a_0$, $a_1$, $a_2$, $a_3$, $b_0$, $b_1$ directly and apply them directly to the digital-to-analog converters, e.g. via a suitable data bus.

Each of the three digital-to-analog converters 31, 32, 33 has a reference input. These reference inputs are supplied with different analog signals which represent the respective values to which the digital-to-analog conversions are referred. Associated with each digital-signal input is a signal enable input, so that each digital-to-analog converter has two signal enable inputs, each of which is supplied with one of the clock signals $T_{27}$, $T_{28}$ from the clock generator 61.

The reference input of the first digital-to-analog converter 31 is the first input of the adjusting circuit 30. It is connected to the operating potential U, as was mentioned above. The first signal input of the first digital-to-analog converter 31 is fed with the digitized zero adjustment value $A_0$, and the second signal input with the digitized first span adjustment value $A_2$.

The reference input of the second digital-to-analog converter 32 is the second input of the adjusting circuit 30. This input is connected to the tap of the temperature-dependent voltage divider 71 and, thus, to the temperature-dependent signal $U \cdot v_t$, as was mentioned above. The first signal input of the second digital-to-analog converter 32 is fed with the digitized temperature coefficient zero adjustment value $A_1$, and the second signal input with the digitized temperature coefficient span adjustment value $A_3$.

The reference input of the third digital-to-analog converter 33 is the third input of the adjustment circuit 30. It is supplied with the output signal S, as was mentioned above. The first signal input of the third digital-to-analog converter 33 is fed with the digitized second span adjustment value $B_0$, and the second signal input with the digitized linearization adjustment value $B_1$.

The adjusting circuit 30 further includes a first summer 41 and a second summer 42 each having six inputs and one output.

The first and second inputs of the first summer 41 are supplied, respectively, with the positive and negative converter signals of the third digital-to-analog converter 33 via first and second switches 1, 2.

The first and second inputs of the second summer 42 are supplied, respectively, with the positive and negative converter signals of the third digital-to-analog converter 33 via third and fourth switches 3, 4.

The third and fourth inputs of the first summer 41 are supplied, respectively, with the positive and negative converter signals of the first digital-to-analog converter 31 via fifth and sixth switches 5, 6.

The third and fourth inputs of the second summer 42 are supplied, respectively, with the positive and negative converter signals of the first digital-to-analog converter 31 via seventh and eighth switches 7, 8.

The fifth and sixth inputs of the first summer 41 are supplied, respectively, with the positive and negative converter signals of the second digital-to-analog converter 32 via ninth and tenth switches 9, 10.

The fifth and sixth inputs of the second summer 42 are supplied, respectively, with the positive and negative converter signals of the second digital-to-analog converter 32 via eleventh and twelfth switches 11, 12.

The respective terminals of the measuring and reference capacitors $K_m$, $K_r$, remote from the switches are connected to the first reference potential SN. Since the voltage divider 71 and the operating potential U are also referred to the first reference potential SN, only ratios are processed in the arrangement.

The outputs of the first and second summers 41, 42 are connected, via a 13th switch 13 and a 14th switch 14, respectively, to the measuring capacitor $K_m$ and, via a 15th switch 15 and a 16th switch 16, respectively, to the reference capacitor $K_r$.

Figure 2:
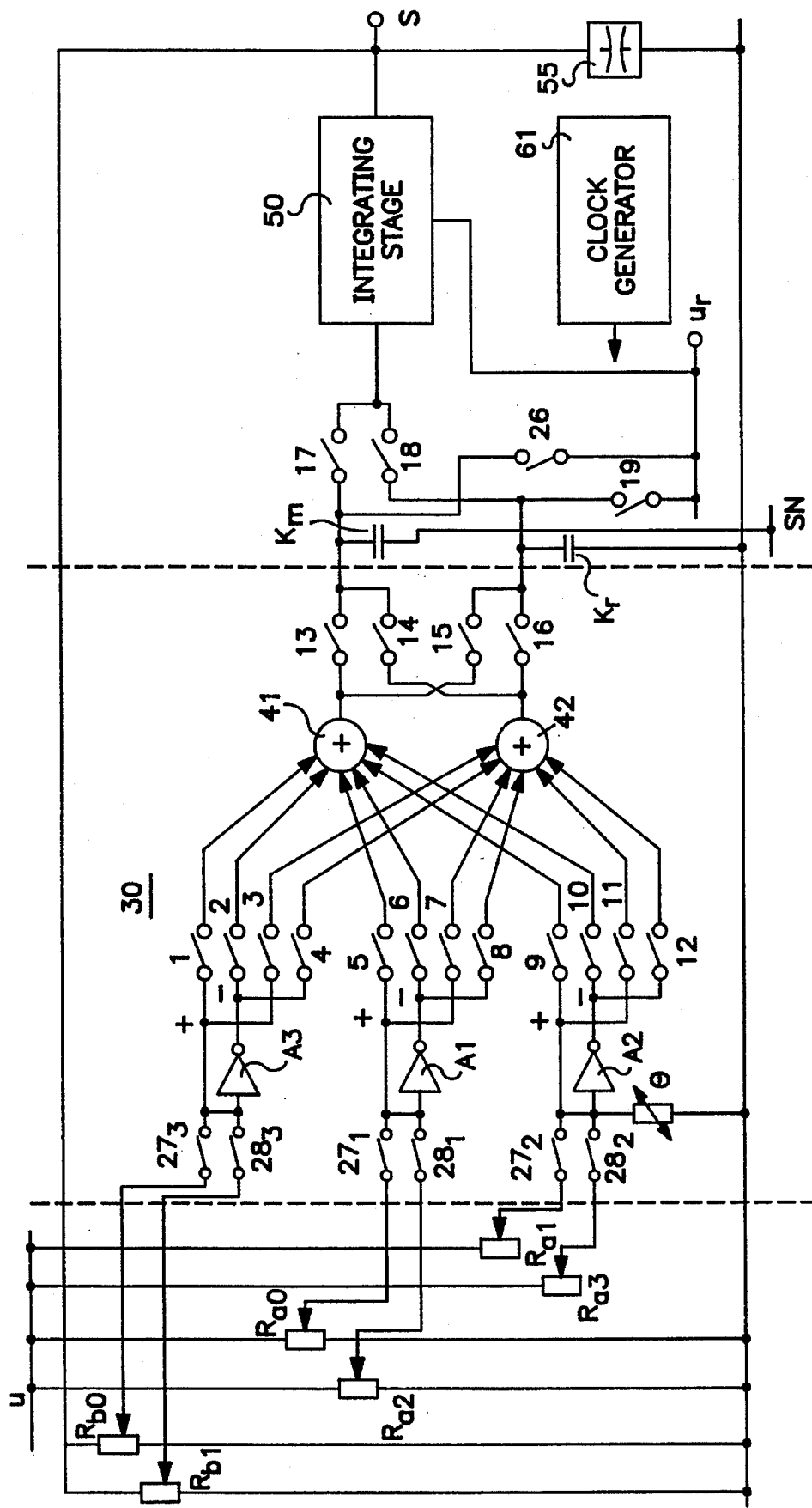
FIG. 2 is a schematic circuit diagram of a second embodiment of the invention.

FIG. 2 shows a second embodiment in a schematic circuit diagram. It differs from the embodiment of FIG. 1 in that instead of the three digital-to-analog converters 31, 32, 33, tapped resistors $R_{a0}$, $R_{a1}$, $R_{a2}$, $R_{a30}$, $R_{b0}$, $R_{b1}$ are provided, by means of which the analog adjustment quantities $a_0$, $a_1$, $a_2$, $a_3$, $b_0$, $b_1$ are generated.

The broken vertical line at the left in FIG. 2 indicates the interface with regard to the implementation of the arrangement: The tapped resistors can be implemented using hybrid technology, for example, and the portion of the arrangement located on the right of this line can advantageously be realized using semiconductor monolithic integrated circuitry.

If the user of the arrangement is to be permitted to change the adjustment quantities at least in part, the tapped resistors will be implemented as potentiometers, for example. If the arrangement is preset by the manufacturer, the tapped resistors will be implemented as, preferably laser-trimmed, semiconductor or thin-film resistors.

Each tapped resistor $R_{a0}$, $R_{a2}$ is connected as a voltage divider between the first reference potential SN and the operating potential U. The taps of the resistors $R_{a0}$ and $R_{a2}$ are connected via further switches $27_1$ and $28_1$, respectively, to the input of an analog inverter $I_1$ and to the fifth switch 5 and the seventh switch 7. The output of the analog inverter $I_1$ is coupled to the sixth switch 6 and the eighth switch 8. The switch $27_1$ is supplied with the clock signal $T_{27}$, and the switch $28_1$ with the clock signal $T_{28}$.

The taps of the resistors $R_{a1}$ and $R_{a3}$ are connected via further switches $27_2$ and $28_2$, respectively, to the ungrounded terminal of the temperature sensor θ, to the input of an analog inverter $I_2$, and to the ninth switch 9 and the eleventh switch 11. The output of the analog inverter $I_2$ is coupled to the tenth switch 10 and the twelfth switch 12. The switch $27_2$ is supplied with the clock signal $T_{27}$, and the switch $28_2$ with the clock signal $T_{28}$. Thus, in FIG. 2, two voltage dividers corresponding to the voltage divider 71 of FIG. 1 and each containing the temperature sensor θ are implemented when the associated switches $27_2$ and $28_2$, respectively, are closed.

Each tapped resistor $R_{b0}$, $R_{b1}$ is connected as a voltage divider between the first reference potential SN and the output of the arrangement; these resistors are thus supplied with the smoothed output signal S. The taps of the resistors $R_{b0}$ and $R_{b1}$ are connected via further switches $27_3$ and $28_3$, respectively, to the input of an analog inverter 13 and to the first switch 1 and the third switch 3. The output of the analog inverter $I_3$ is coupled to the second switch 2 and the fourth switch 4. The switch $27_3$ is supplied with the clock signal $T_{27}$, and the switch $28_3$ with the clock signal $T_{28}$.

Figure 4:
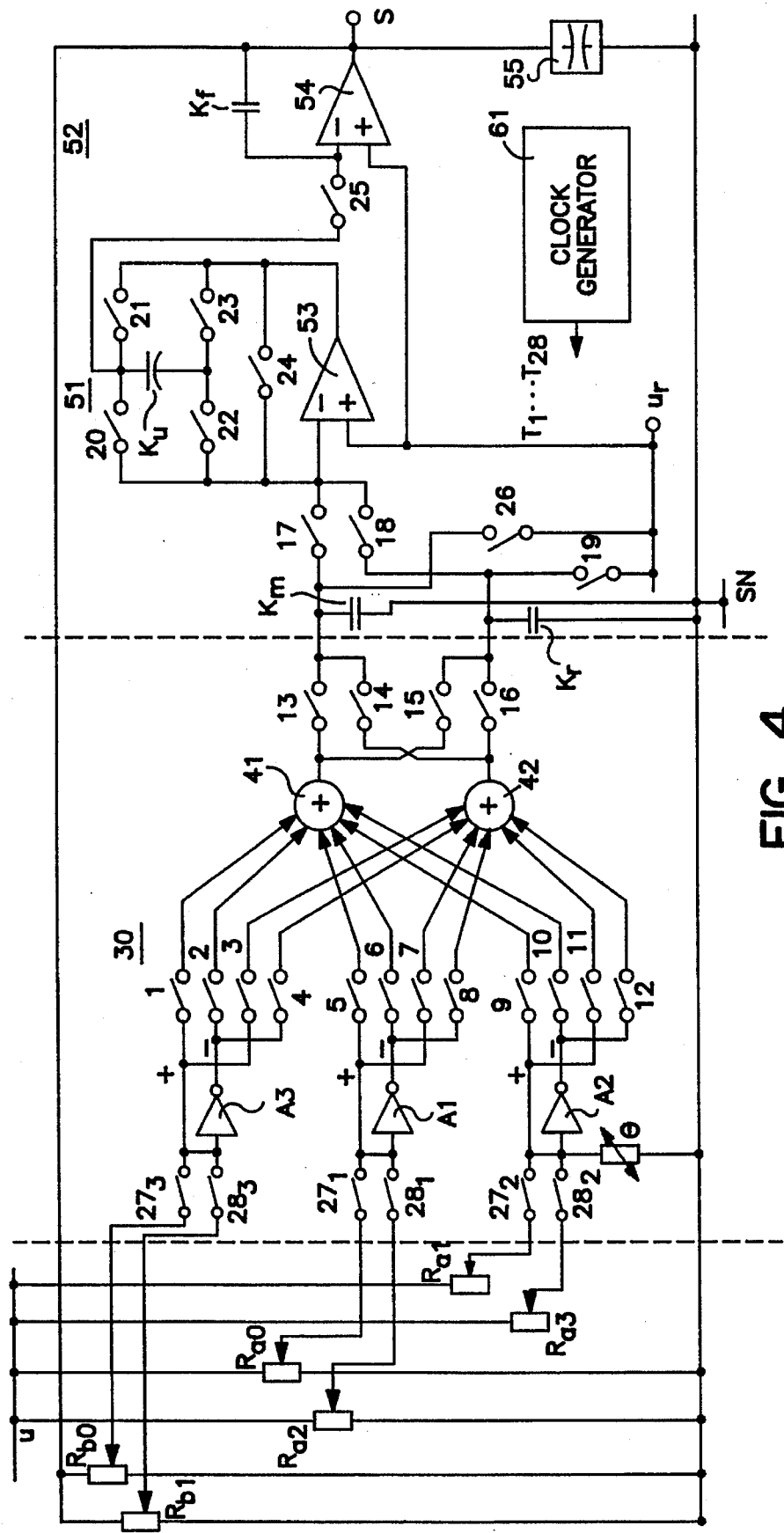
FIG. 4 shows the schematic circuit diagram of of FIG. 2 with the further advantageous features of FIG. 3.

In FIGS. 3 and 4, which show preferred embodiments of the arrangements of FIGS. 1 and 2, respectively, only the parts of the circuit located at the right differ from those of FIGS. 1 and 2, so that only these right-hand parts will be explained; they are preferred embodiments of the integrating stages 50 of FIGS. 1 and The signals present at the measuring and reference capacitors $K_m$, $K_r$ are applied under clock control to a first integrator 51. The latter includes a first operational amplifier 53, whose inverting input is connected via a 17th switch 17 to the measuring capacitor $K_m$ and via an 18th switch 18 to the reference capacitor $K_r$, with the junction of the 18th switch and the reference capacitor connected via a 19th switch 19 to a second reference potential $U_r$.

This second reference potential $U_r$ is different from ground potential and from the operating potential U. It preferably lies approximately in the middle between the first reference potential SN and the operating potential U, for example. Thus, if a value of, for example, +5 V is fixed for the operating potential U, the second reference potential $U_r$ will be chosen to be around +2.5 V.

Also connected to the second reference potential $U_r$ is the noninverting input of the first operational amplifier 53, whose inverting input is connected to the output via three parallel branches. The first parallel branch consists of a 20th switch 20 and a 21st switch 21 in series; the second parallel branch consists of a 22nd switch 22 and a 23rd switch 23 in series, and the third parallel branch consists of a 24th switch 24. A capacitor $K_u$, whose polarity must be reversed, is connected between the junction of the 22nd and 23rd switches and the junction of the 20th and 21st switches; the latter junction is also the output of the first integrator 51.

The signal appearing at the output of the first integrator 51 is applied under clock control to a second integrator 52. The latter comprises a second operational amplifier 54, whose inverting input is connected via a 25th switch 25 to the junction of the 20th and 21st switches and via a fixed capacitor $K_f$ to the output of the arrangement, and whose noninverting input is connected to the second reference potential $U_r$.

In the arrangement explained so far, the signal processing is based either on the capacitance ratio $C_{V1}=(C_m-C_r)/C_m$ or on the capacitance ratio $C_{V2}=(C_m-C_r)/(C_m+C_r)$. If the capacitance ratio $C_{V3}=(C_{m-C_r})/C_r$ is to be processed, a 26th switch 26 must be placed between the second reference potential $U_r$ and the junction of the 17th switch 17 and the measuring capacitor $K_m$.

Figure 5:
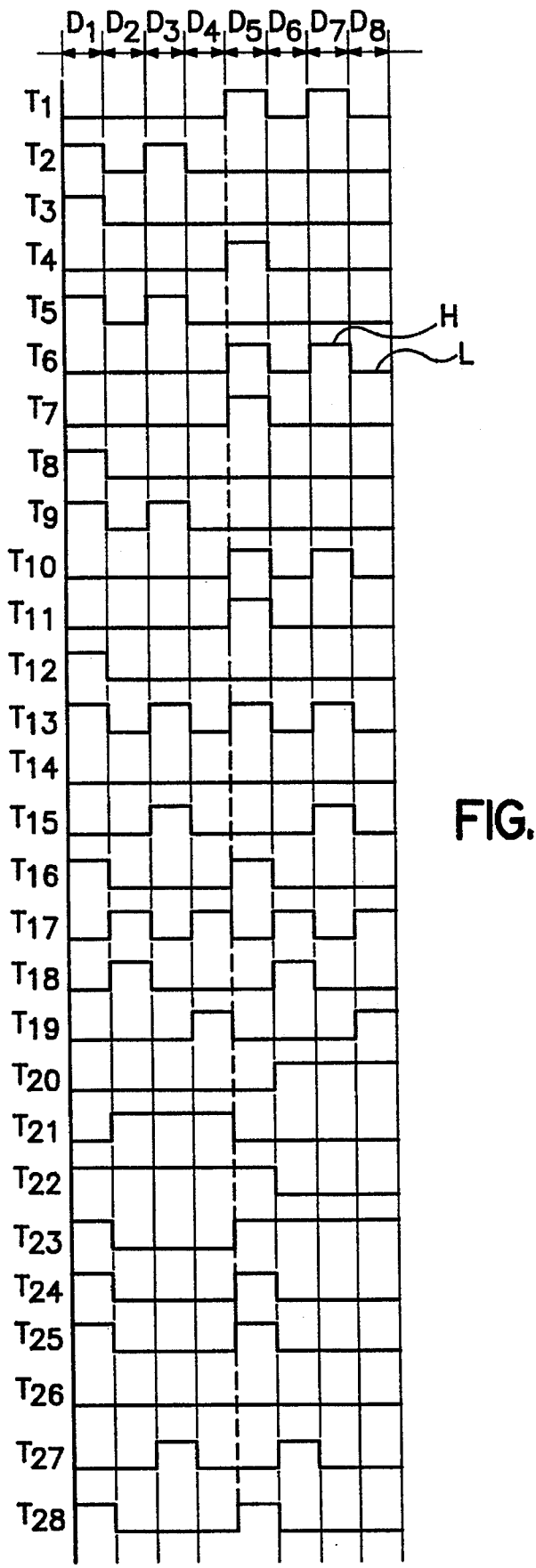
FIG. 5 shows the waveforms of clock signals if the capacitance ratio $(C_m-C_r)/C_m$ is to be compensated with an arrangement as illustrated in FIG. 3 or FIG. 4.
Figure 6:
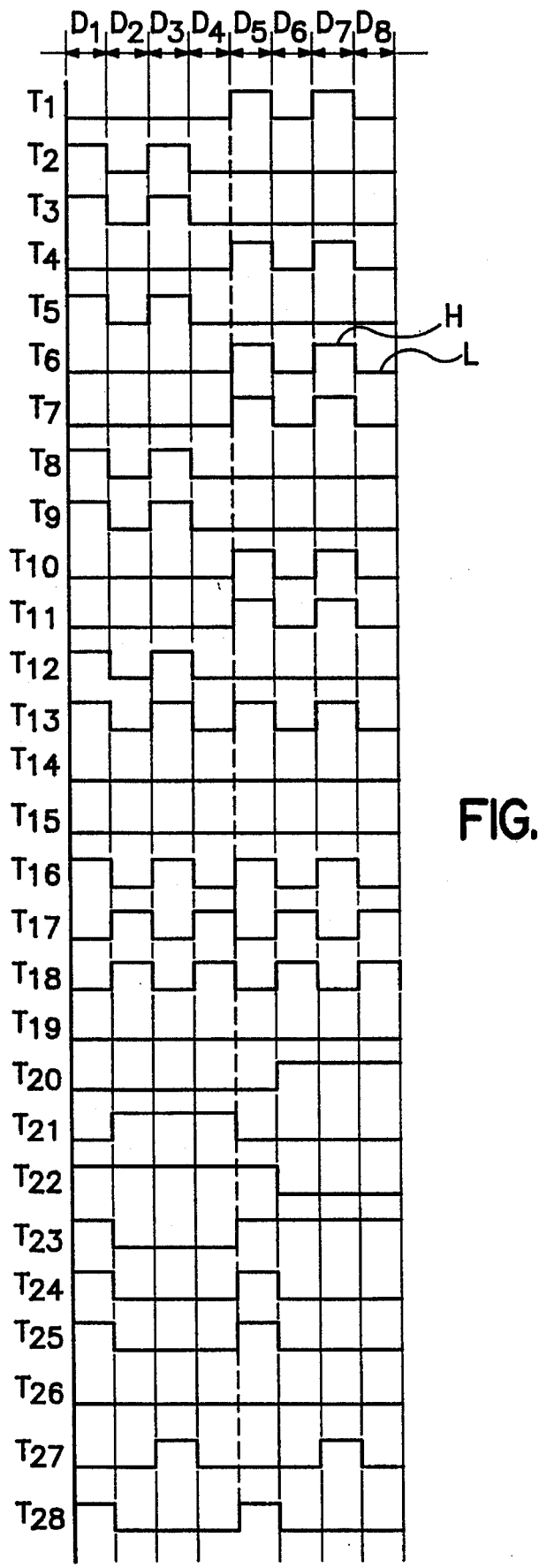
FIG. 6 shows the waveforms of clock signals if the capacitance ratio $(C_m-C_r)/(C_m+C_r)$ is to be compensated with an arrangement as illustrated in FIG. 3 or FIG. 4.
Figure 7:
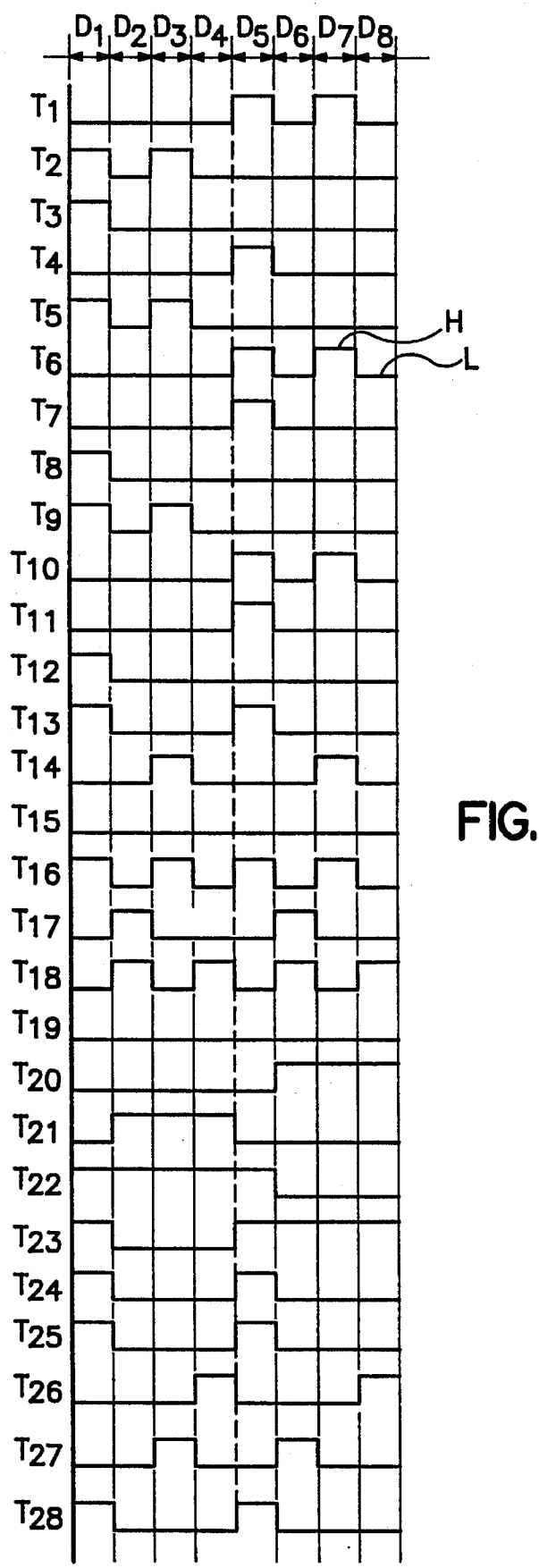
FIG. 7 shows the waveforms of clock signals if the capacitance ratio $(C_m-C_r)/C_r$ is to be compensated with an arrangement as illustrated in FIG. 3 or FIG. 4.

The clock generator 61 generates, from a basic clock signal, 28 clock signals $T_1 \ldots T_{28}$ for controlling the 26 switches 1 ... 26 and the respective signal enable inputs of the three digital-to-analog converters 31, 32, 33, see FIGS. 5 to 7. The clock signals $T_1 \ldots T_{28}$ have a positive level H or a more negative level L. The respective level occurs during at least one eighth $D_1 \ldots D_8$ of the period $D=\Sigma(D_1 \ldots D_8)$ of the basic clock signal.

The respective H levels switch the 26 switches and the respective switches of the six signal enable inputs of the three digital-to-analog converters 31, 32, 33 into the conducting state, and the respective L levels switch these switches into the nonconducting state. The switches are preferably implemented with electronic components, such as transistors, particularly insulated-gate field-effect transistors.

The clock signals $T_1 \ldots T_{28}$ are derived in the clock generator 61 from an oscillator signal having a period equal to $D_1$, e.g., by frequency division and logical combination of the frequency-divided signals, as is familiar to those skilled in the art. The above-mentioned basic clock signal is obtained by dividing the frequency of the oscillator signal by 8.

The clock signals $T_{13}, T_{17}$ of FIG. 5, for example, are generated by dividing the oscillator signal by 2 and are 180° out of phase with respect to each other. The clock signals $T_4, T_7, T_{11}$ of FIG. 5 are derived from the basic clock signal, and their H levels have been placed in the fifth eighth $D_5$ of the period D.

The assignment of the respective H and L levels to the individual eighths of the period of each clock signal and their effect will now be described in more detail.

FIG. 5 shows the waveforms of the clock signals T during one period D of the basic clock signal for the capacitance ratio $C_{V1}=(C_m-C_r)/C_m$. As can be seen, a few of the clock signals are at a constant L level, namely the clock signals $T_{14}, T_{26}$, so that actually the switches 14, 26 controlled by them need not be implemented and the clock signals $T_{14}, T_{26}$ need not be generated.

FIG. 6 shows the waveforms of the clock signals T during one period D of the basic clock signal for the capacitance ratio $C_{V1}=(C_m-C_r)/(C_m+C_r)$. Here, too, a few of the clock signals are at a constant L level, namely the clock signals $T_{14}, T_{15}, T_{19}, T_{26}$, so that actually the switches 14, 15, 19, 26 controlled by them need not be implemented and the clock signals $T_{14}, T_{15}, T_{19}, T_{26}$ need not be generated.

FIG. 7 shows the waveforms of the clock signals T during one period D of the basic clock signal for the capacitance ratio $C_{V1}=(C_m-C_r)/C_r$. Here, too, a few of the clock signals are at a constant L level, namely the clock signals $T_{15}, T_{19}$, so that actually the switches 15, 19 controlled by them need not be implemented and the clock signals $T_{15}, T_{19}$ need not be generated.

The reason why these switches and clock signals, which are not needed to implement the respective capacitance ratios, are shown nevertheless is that in FIGS. 1 to 4, the common circuit for implementing any of the three variations $C_{V1}, C_{V2}, C_{V3}$ of the capacitance ratio of the arrangement is illustrated. Because of these systematics of the representation of the invention, however, the switches not needed for a particular capacitance ratio and the corresponding clock signals are included in FIGS. 1 to 4 and FIGS. 5 to 7, respectively.

If the measurement is to be based on only one of the three capacitance ratios, those switches to which a constant L level is applied need not be implemented and the associated clock signals need not be generated, of course.

As can be seen from the waveforms of the clock signals of FIGS. 5 to 7, during the second four periods $D_5 \ldots D_8$, the respective inverse outputs, compared to the periods $D_1 \ldots D_4$, of the digital-to-analog converters 31, 32, 33 of FIGS. 1 and 3 and the inverse signals of the tapped resistors of FIGS. 2 and 4 are applied through the respective switches to the capacitors $K_m$, $K_r$.

Furthermore, in the embodiments of FIGS. 3 and 4, the polarity of the capacitor $K_u$ is reversed during the second four periods $D_5 \ldots D_8$ from that during the first four periods $D_1 \ldots D_4$ by means of the associated switches. This periodic polarity reversal makes it possible to compensate offset voltages of the operational amplifiers in the arrangement, and may be referred to as "chopper technique".

Figure 8:
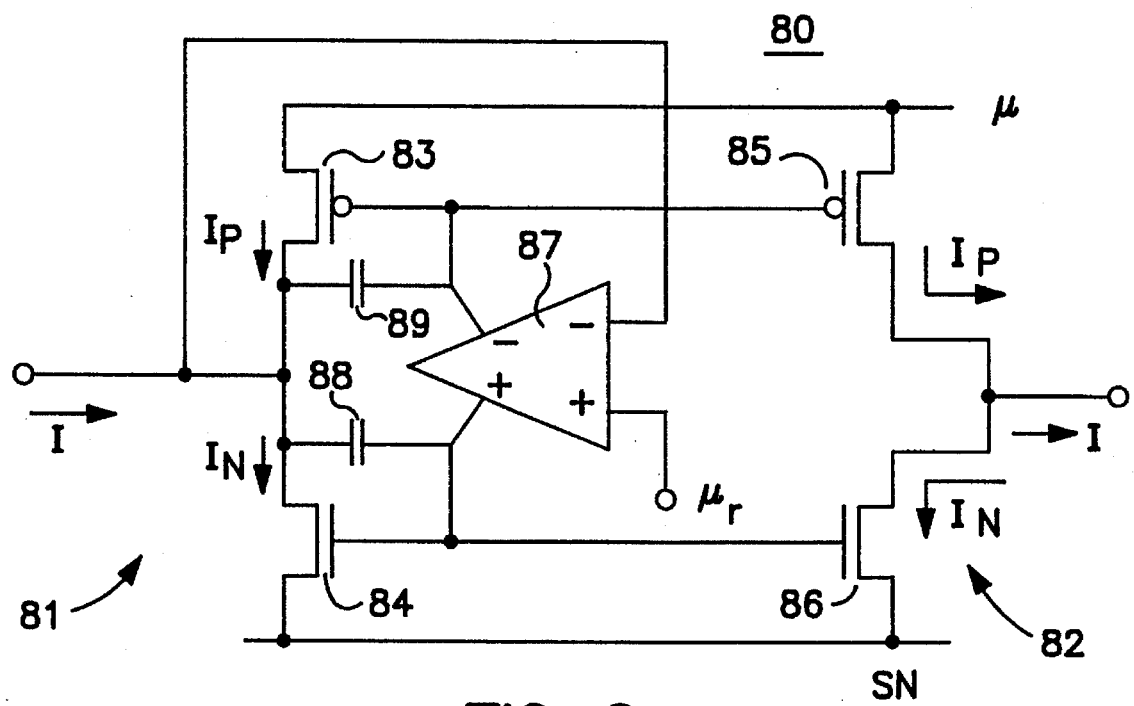
FIG. 8 is a schematic circuit diagram of a specific current-copier circuit usable in the arrangement of the invention.

FIG. 8 shows the schematic circuit diagram of a specific current-mirror circuit, referred to here as "current copier" to distinguish it from conventional current mirrors. This current copier 80 will be used to advantage if in the embodiments of FIGS. 2 and 4, i.e., in the embodiments with resistors as generators of the analog adjustment quantities $a_0, a_1, a_2, a_3, b_0, b_1$, the inputs of the summers 41, 42 are to be supplied with voltage signals which are as ideal as possible, i.e., with voltages from a voltage source having as low an internal resistance as possible. With the respective taps at the voltage dividers, drawn as direct taps in FIGS. 2 and 4 to simplify the illustration, this condition is not fulfilled, of course.

Figure 9:
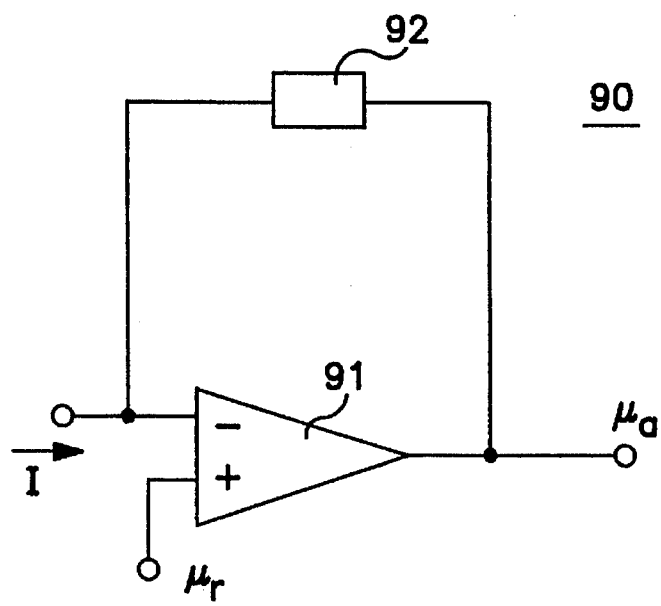
FIG. 9 shows a current-to-voltage converter usable in connection with the circuit of FIG. 8.

A current copier as shown in FIG. 8 generates a current which is independent of the potential at the respective voltage-divider tap. The current is then transformed, by means of a current-to-voltage converter as shown in FIG. 9, into a voltage which is delivered by a voltage source with a low internal resistance.

Referring to FIG. 8 in more detail, there is shown a first series combination 81 of two transistors 83, 84 of complementary conductivity type which have their controlled current paths connected in series between the operating potential U and the first reference potential SN.

The figure further shows a second series combination 82 of two transistors 85, 86 of complementary conductivity type which have their controlled current paths connected in series between the operating potential U and the first reference potential SN.

The control terminals of the two transistors 83, 85 of one conductivity type are connected together, and so are the control terminals of the two transistors 84, 86 of the other conductivity type.

The circuit symbol shown for the transistors of each series combination 81, 82 in FIG. 8 is that of enhancement-mode insulated-gate field-effect transistors—transistors 83 and 85 are p-channel transistors, and transistors 84 and 86 n-channel transistors—, but other types of transistors are also usable; this depends on the specific implementation technology used.

The junction of the current paths of the transistors 83, 84 of the first series combination 81 is coupled to the inverting input of a further operational amplifier 87, whose noninverting input is connected to the second reference potential $U_r$. The operational amplifier 87 has a differential output whose positive terminal is connected to the junction of the control terminals of the two transistors 84, 86, and whose negative terminal is connected to the junction of the control terminals of the two transistors 83, 85. These terminals are also connected via capacitors 88 and 89, respectively, to the junction of the controlled current paths of the transistors of the first series combination 81.

Also indicated in FIG. 8 is the behavior of the current copier with respect to the input current I. The input current I divides into a "positive" current $I_P$, which flows through the transistor 83, and a "negative" current $I_N$, which flows through the transistor 84. Corresponding—copied—currents $I'_P$ and $I'_N$ flow through the transistors 85 and 86, respectively, of the second series combination 82 and add to form the copied—current I'.

The current-to-voltage converter 90 shown in FIG. 9 serves to convert the current I' of FIG. 8 into an output voltage $U_a$. To this end, the output of the current copier 80 must be coupled to the input of the current-to-voltage converter 90. The latter consists of a further operational amplifier 91, which has its inverting input connected via a resistor 92 of resistance $R_{92}$ to its output, and which is the input of the current-to-voltage converter 90, while the noninverting input is connected to the second reference potential $U_r$. Thus the output voltage is: $U_a = I' \cdot R_{92}$.

The circuits of FIGS. 8 and 9 can be used to advantage if the arrangement according to the invention is to be implemented as a semiconductor integrated circuit.

One advantage of the current copier of FIG. 8 is that it requires no buffer amplifier at its input, and hence no resistors of the amplifier, which, with the integrated circuit technology just mentioned, would have to be implemented as semiconductor resistors with the disadvantages inherent in them. In addition, the offset voltage of the current copier can be compensated by the chopper technique used in the invention (see above).

The operation of one of the above embodiments of the invention will now be explained in more detail with reference to FIGS. 10 to 18. The embodiment shown in FIGS. 3 and 5 will be described for the case where the second reference potential $U_r$ is equal to the first reference potential SN and the latter is equal to ground potential. The description is thus based on the embodiment in which the capacitance ratio $C_{V1} = (C_m - C_r)/C_m$ is used.

Figure 15:
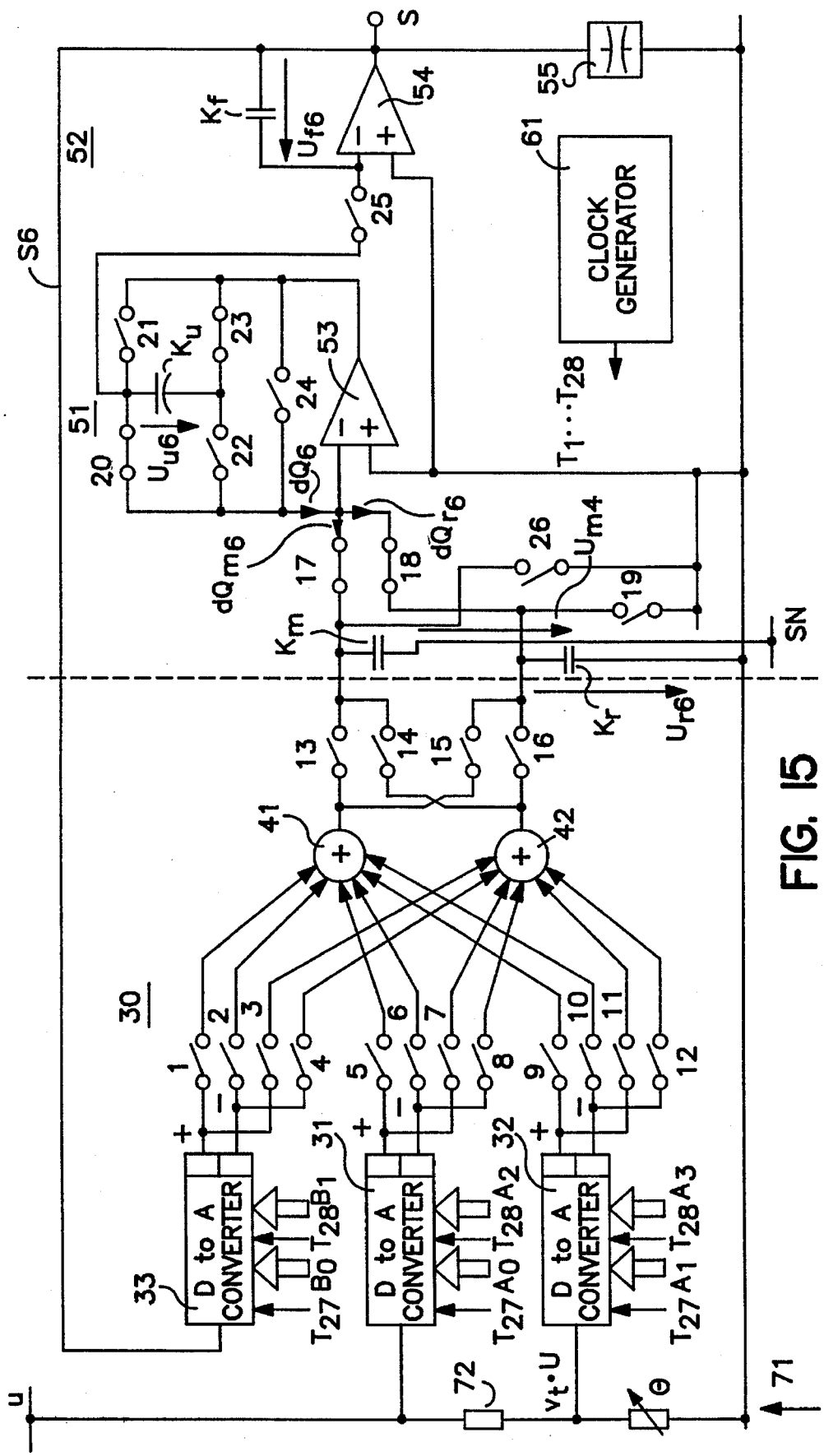
FIG. 15 shows the switch positions in the arrangement of FIG. 3 during period $D_6$ of FIG. 5.
Figure 16:
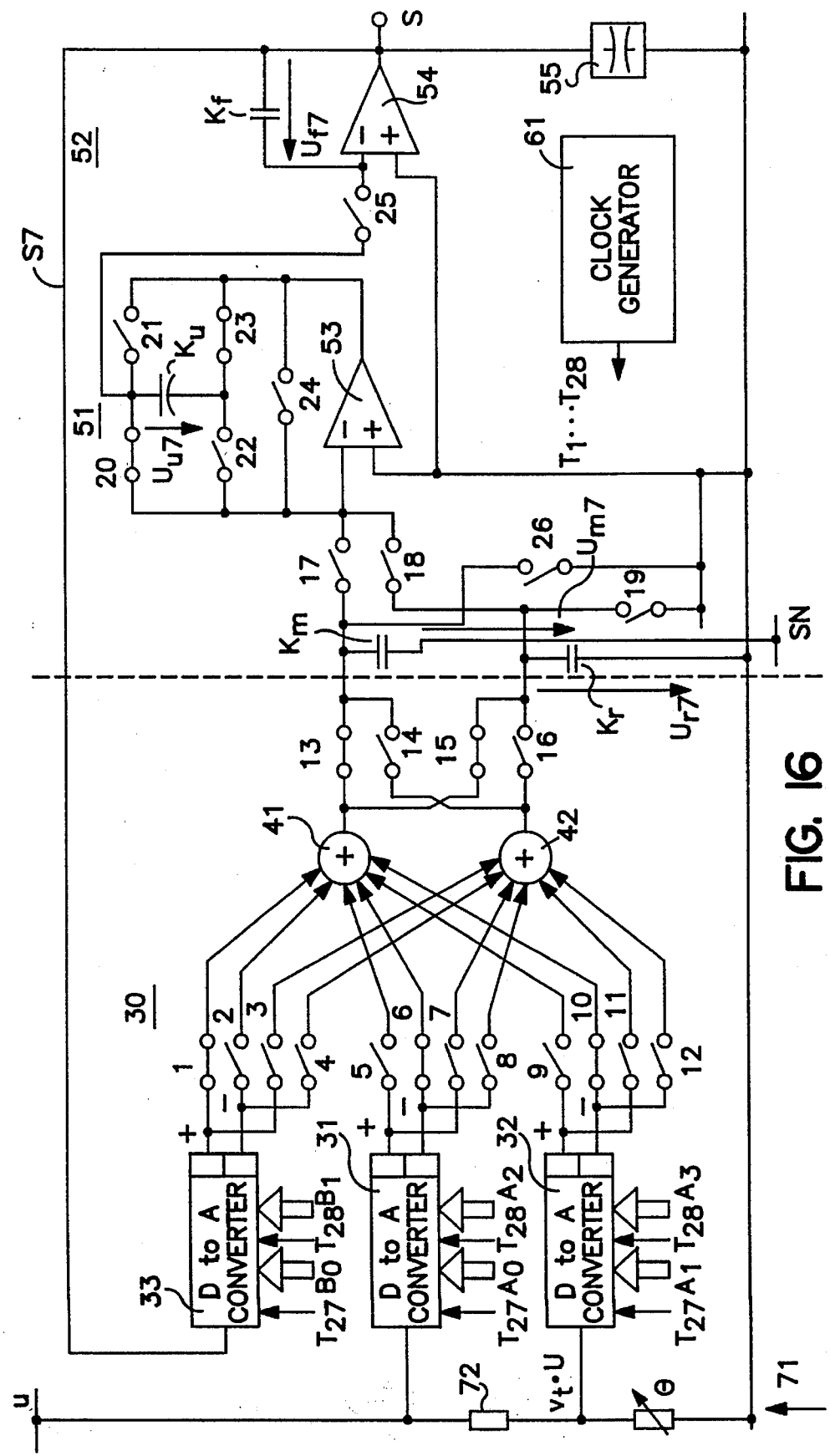
FIG. 16 shows the switch positions in the arrangement of FIG. 3 during period $D_7$ of FIG. 5.
Figure 17:
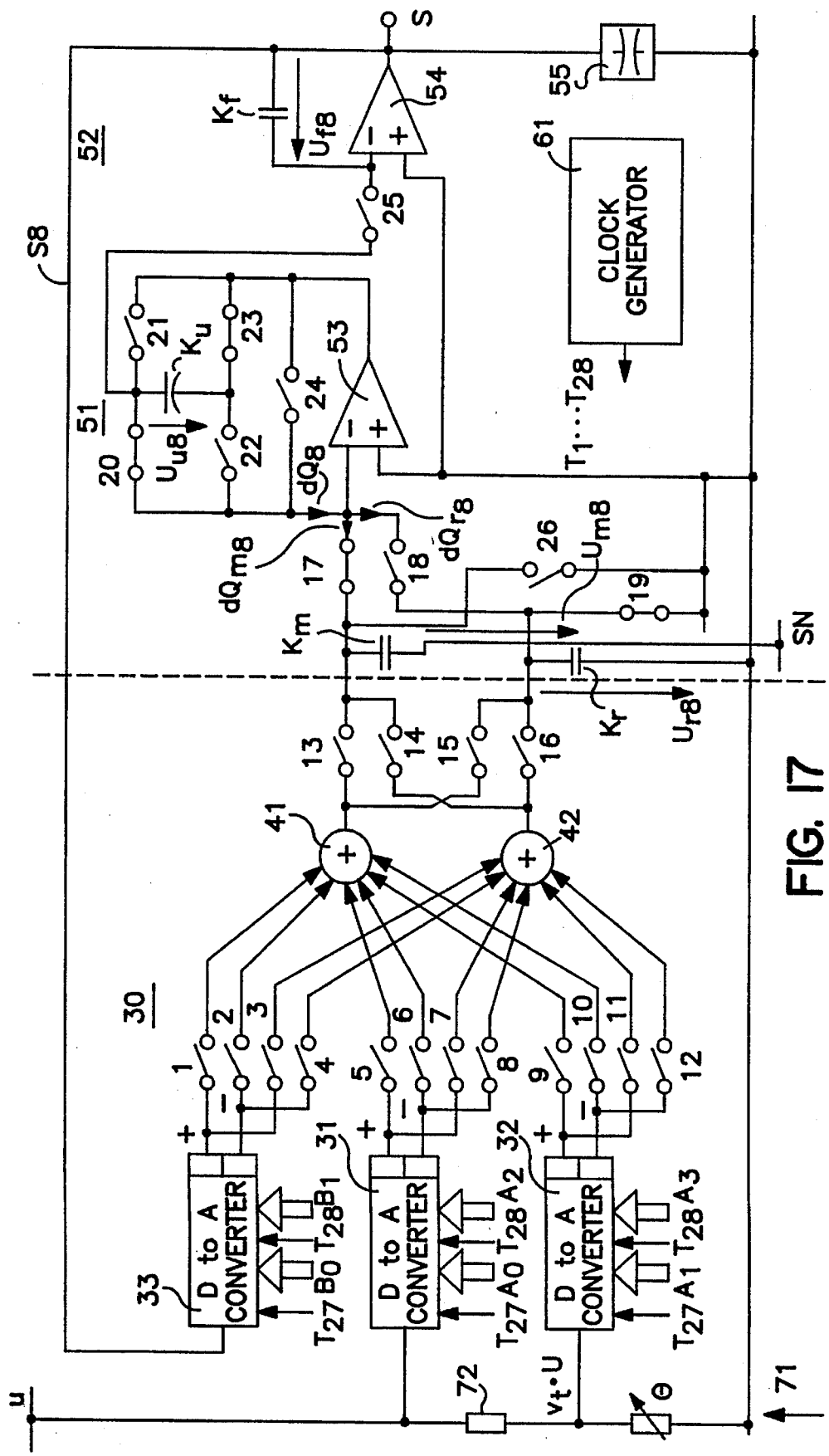
FIG. 17 shows the switch positions in the arrangement of FIG. 3 during period $D_8$ of FIG. 5.
Figure 18:
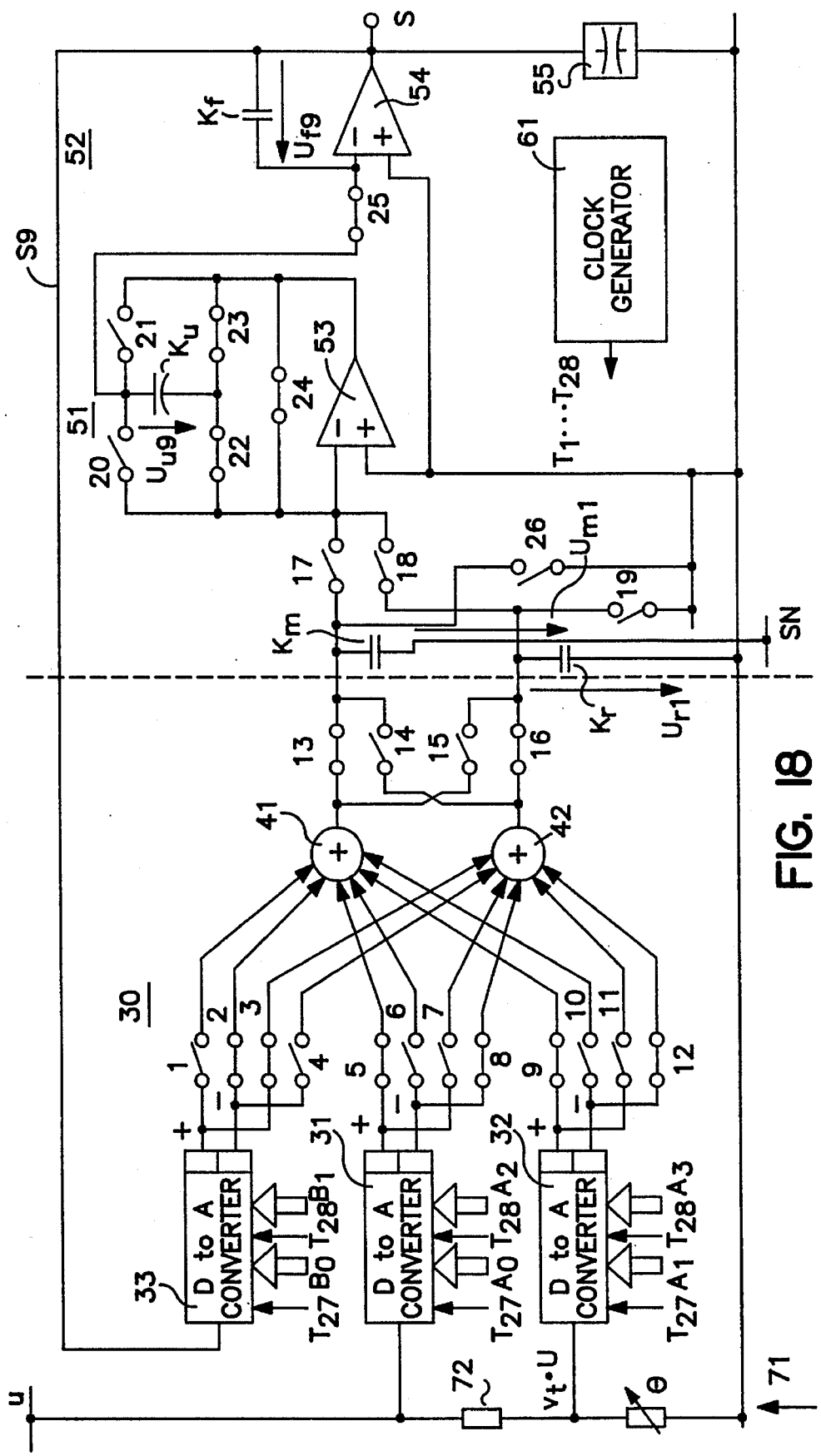
FIG. 18 shows the switch positions in the arrangement of FIG. 3 during period $D_9$ of FIG. 5.

Each of FIGS. 10 to 17 shows the states of the switches 1 to 26 during a respective one of the eight periods $D_1 \ldots D_8$ of FIG. 5, and FIG. 18 shows the states during period $D_9$, which follows period $D_8$ of FIG. 17 and, with regard to the clock signals, is identical with period $D_1$. In FIGS. 10 to 18, the switches rendered conductive by the respective H levels of the clock signals $T_1 \ldots T_{26}$ are illustrated by the symbol of a closed switch.

Also shown in FIGS. 10 to 18 are arrows for the instantaneous voltages $U_m$, $U_r$, $U_u$, $U_f$ across the capacitors $K_m$, $K_r$, $K_u$, $K_f$. In some of these figures, current arrows are shown for charge flows $dQ_m$, $dQ_r$, $dQ$.

The voltages $U_m$, $U_r$, $U_u$, $U_f$ and the charges $dQ_m$, $dQ_r$, $dQ$ are provided with the respective index numbers 1 ... 9 of the associated periods; $U_{m1}$ thus belongs to period $D_1$. In the following, the capacitances of the capacitors $K_u$ and $K_f$ are denoted by $C_u$ and $C_f$, respectively.

Figure 10:
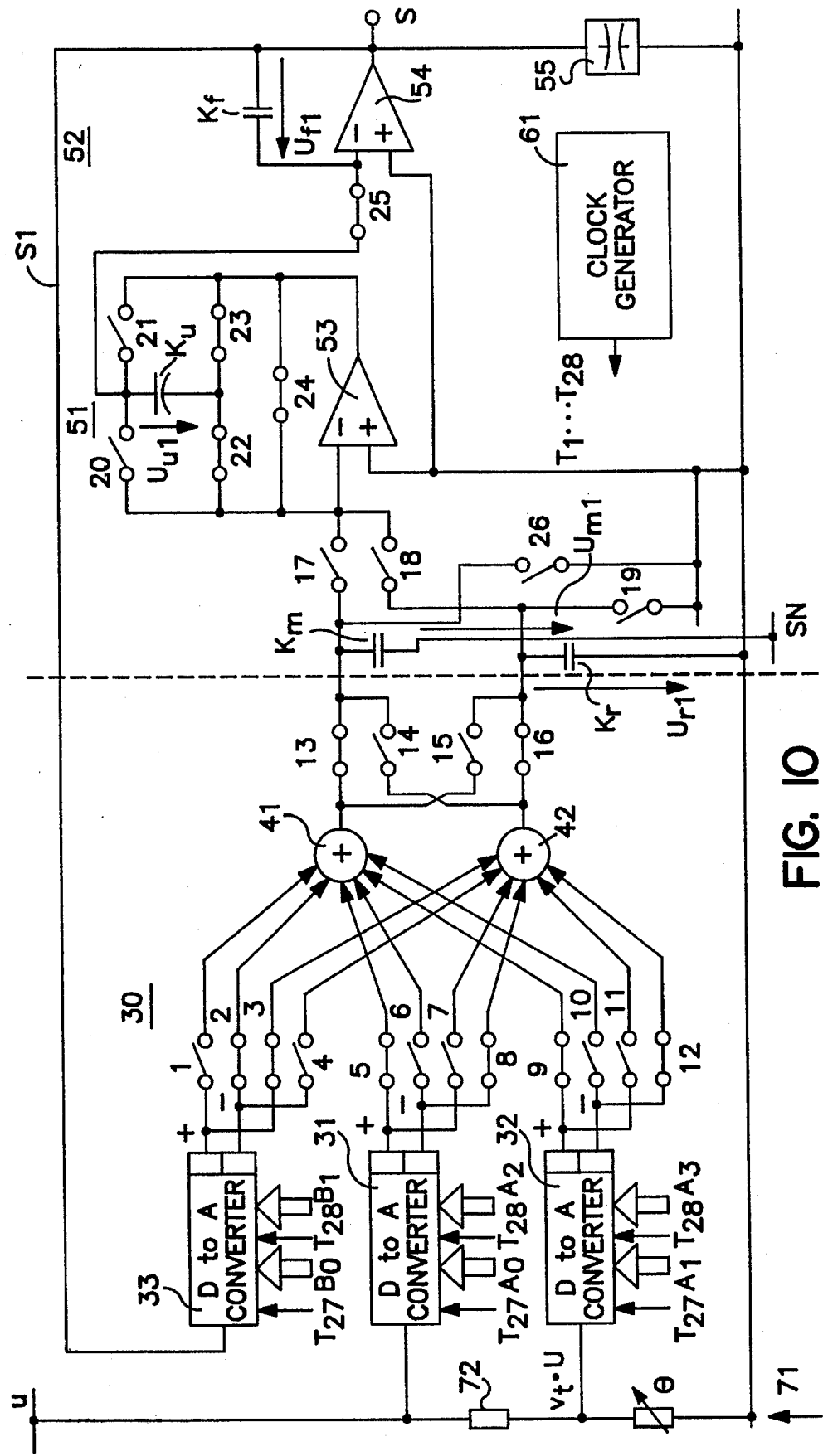
FIG. 10 shows the switch positions in the arrangement of FIG. 3 during period $D_1$ of FIG. 5.

The switch positions during period $D_1$ are shown in FIG. 10. During that period, the switches 2, 3, 5, 8, 9, 12, 13, 16, 22, 23, 24, 25 are closed. Thus, only the adjusting circuit 30 acts on the capacitors $K_m$, $K_r$, since the other switches, particularly the switches 17, 18, 19, 26, are open. The clock signal $T_{28}$ causes the digital signals $A_2$, $A_3$, $B_1$ to be transferred into the three digital-to-analog converters 31, 32, 33, so that the analog signals $\pm a_2$, $\pm a_3$, $\pm b_1$ are provided at the respective converter outputs. Thus, the signals $+a_2$, $+a_3$, $-b_1$ are transferred to the summer 41, and the signals $-a_2$, $-a_3$, $+b_1$ to the summer 42.

Accordingly, the following equations hold:

$$U_{m1} = -b_1 \cdot S + (a_2 + a_3 \cdot v_t) \cdot U \quad (1_1)$$

$$U_{r1} = +b_1 \cdot S - (a_2 + a_3 \cdot v_t) \cdot U \quad (2_1)$$

$$U_{u1} = 0 \quad (4_1)$$

$$U_{f1} = S \quad (5_1)$$

Figure 11:
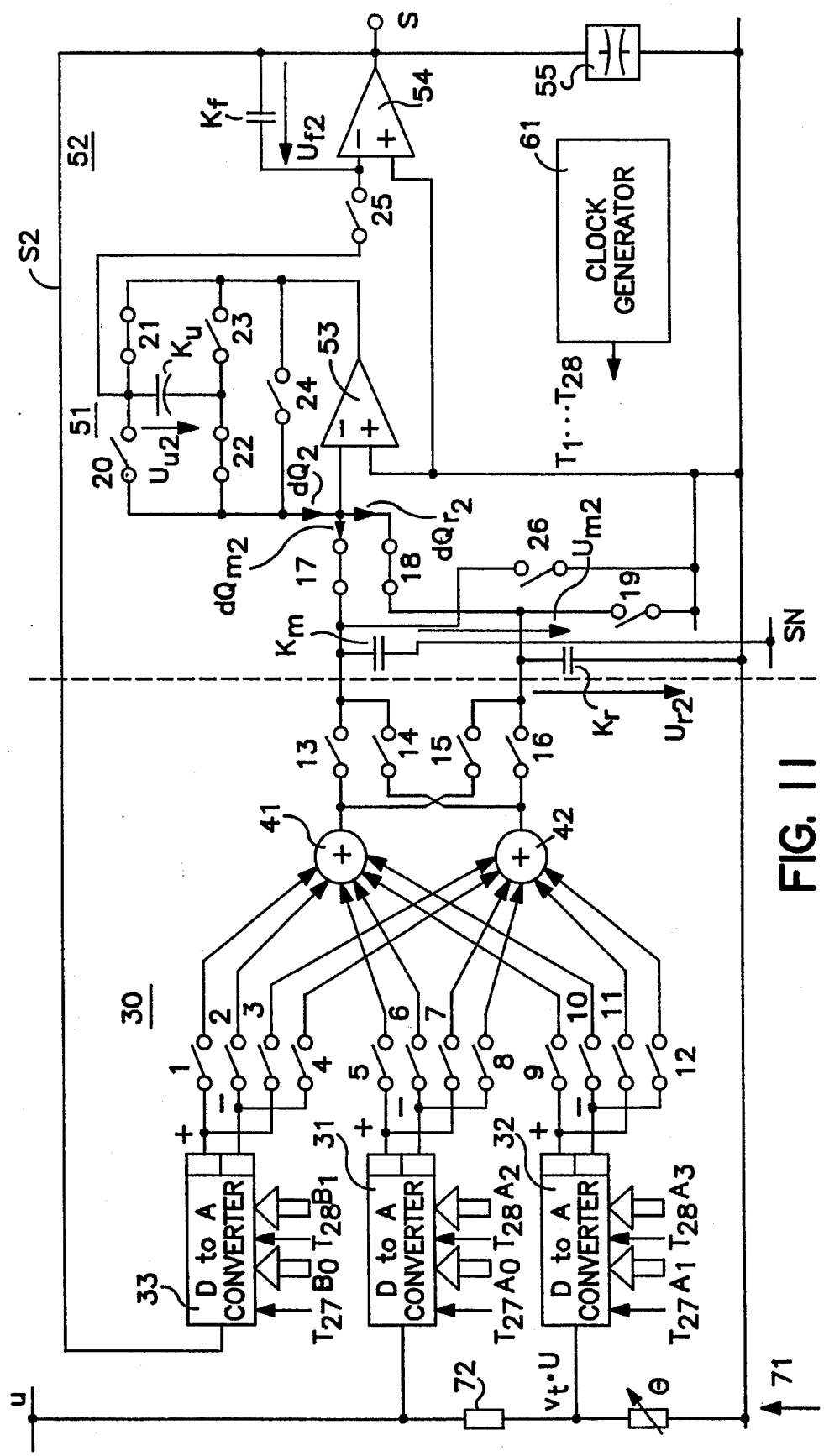
FIG. 11 shows the switch positions in the arrangement of FIG. 3 during period $D_2$ of FIG. 5.

The switch positions during period $D_2$ are shown in FIG. 11. Then the switches 17, 18, 21, 22 are closed. The adjusting circuit 30 is thus disconnected from the capacitors $K_m$, $K_r$, and the charges of the latter are transferred to the capacitor $K_u$, since all other switches are open and the inverting input of the operational amplifier 53 is at virtual ground, i.e., at 0 V, so that during period $D_2$ the two terminals of each of the capacitors $K_m$, $K_r$ are also at 0 V.

Therefore, the following equations hold:

$$dQ_{m2} = (U_{m2} - U_{m1}) \cdot C_m = -[-b_1 \cdot S + (a_2 + a_3 \cdot v_t) \cdot U] \cdot C_m \quad (1_2)$$

$$dQ_{r2} = (U_{r2} - U_{r1}) \cdot C_r = -[+b_1 \cdot S - (a_2 + a_3 \cdot v_t) \cdot U] \cdot C_r \quad (2_2)$$

$$dQ_2 = dQ_{m2} + dQ_{r2} = +[+b_1 \cdot S - (a_2 + a_3 \cdot v_t) \cdot U](C_m - C_r) \quad (3_2)$$

$$U_{u2} = U_{u1} - dQ_2/C_u = +[+b_1 \cdot S - (a_2 + a_3 \cdot v_t) \cdot U](C_m - C_r)/C_u \quad (4_2)$$

$$U_{f2} = S \quad (5_2)$$

Figure 12:
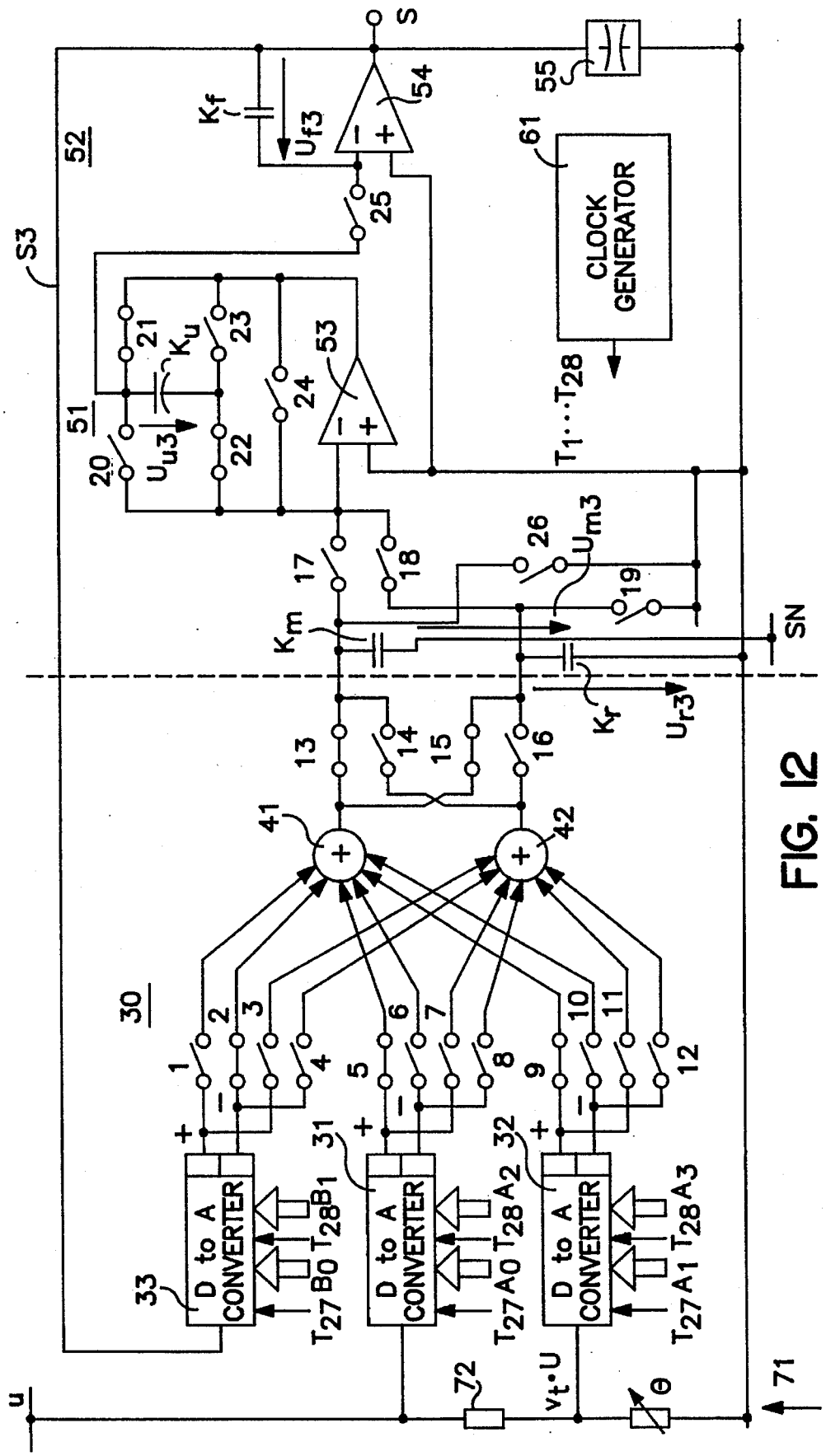
FIG. 12 shows the switch positions in the arrangement of FIG. 3 during period $D_3$ of FIG. 5.

The switch positions during period $D_3$ are shown in FIG. 12. Then the switches 2, 5, 9, 13, 15, 21, 22 are closed. The adjusting circuit 30 thus feeds the capacitors $K_m$, $K_r$, but with voltages other than those shown in FIG. 10. All other switches are open. The clock signal $T_{27}$ causes the digital signals $A_0$, $A_1$, $B_0$ to be transferred into the three digital-to-analog converters 31, 32, 33, so that the analog signals $\pm a_0$, $\pm a_1$, $\pm b_0$ be are provided at the respective converter outputs. Thus, the signals $+a_1$, $+a_1$, $-b_0$ are applied to the summer 41, while the summer 42 receives no signals.

Hence, the following equations hold:

$$U_{m3} = -b_0 \cdot S + (a_0 + a_1 \cdot v_t) \cdot U \quad (1_3)$$

$$U_{r3} = U_{m3} = -b_0 \cdot S + (a_0 + a_1 \cdot v_t) \cdot U \quad (2_3)$$

$$U_{u3} = U_{u2} = +[+b_1 \cdot S - (a_2 + a_3 \cdot v_t) \cdot U](C_m - C_r)/C_u \quad (4_3)$$

$$U_{f3} = S \quad (5_3)$$

Figure 13:
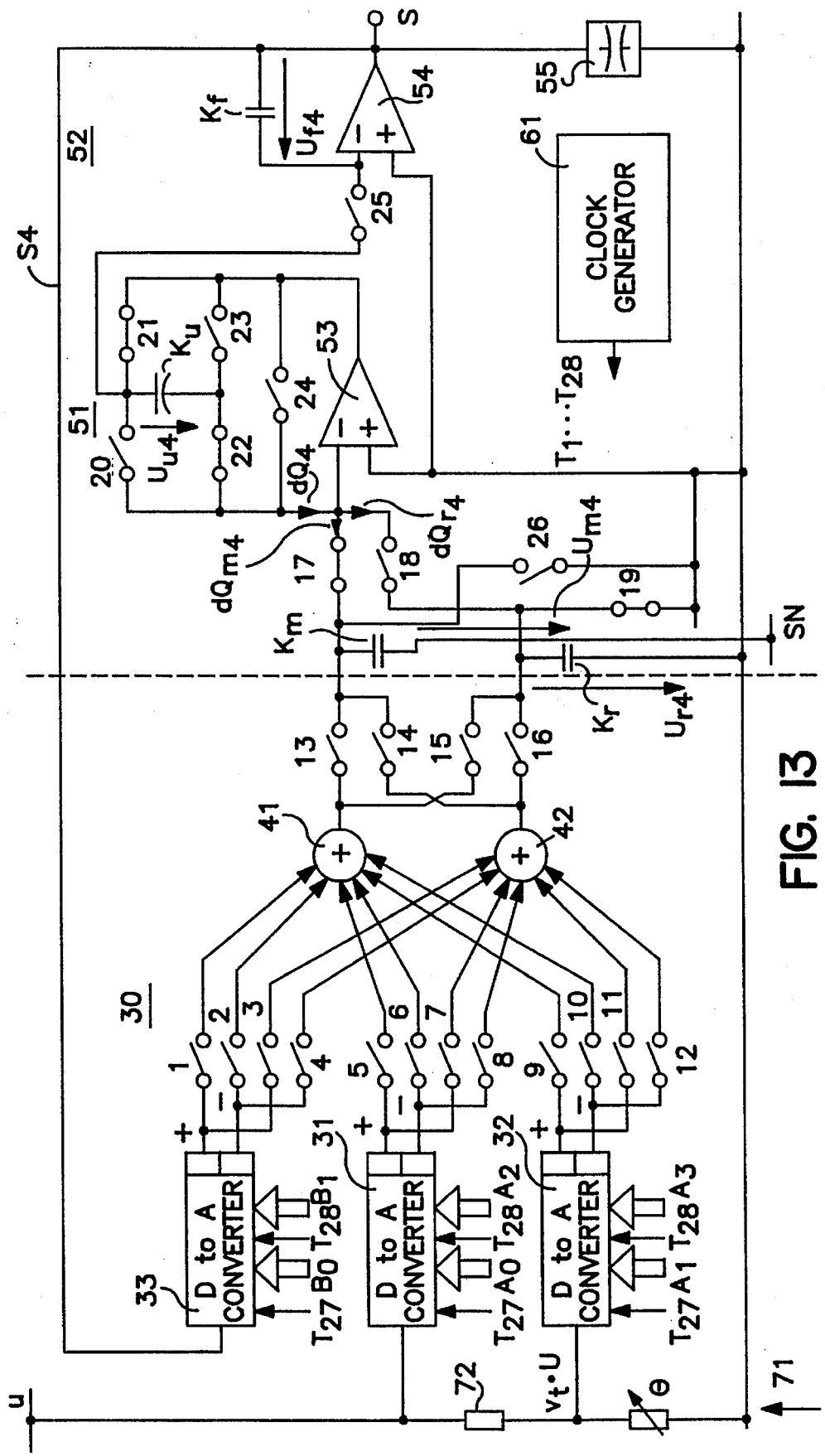
FIG. 13 shows the switch positions in the arrangement of FIG. 3 during period $D_4$ of FIG. 5.

The switch positions during period $D_4$ are shown in FIG. 13. Then the switches 17, 19, 21, 22 are closed. The adjusting circuit 30 is thus disconnected from the capacitors $K_m$, $K_r$, and the capacitor $K_r$ is discharged to ground, so that only the charge of the capacitor $K_m$ is transferred to the capacitor $K_u$, since all other switches are open and since the inverting input of the operational amplifier 53 is at virtual ground potential, i.e., at 0 V, so that during period $D_4$ the terminals of the capacitor $K_m$ are also at 0 V.

Therefore, the following equations hold:

$$dQ_{m4}=(U_{m4}-U_{m3})\cdot C_m=-[-b_0\cdot S+(a_0+a_1\cdot v_t)\cdot U]\cdot C_m \quad (1_4)$$

$$dQ_{r4}=U_{r4}=0 \quad (2_4)$$

$$dQ_4=dQ_{m4}=-[-b_0\cdot S+(a_0+a_1\cdot v_t)\cdot U]\cdot C_m \quad (3_4)$$

$$U_{u4}=U_{u3}+dQ_4/C_u=[b_1\cdot S-(a_2+a_3\cdot v_t)\cdot U]\cdot (C_m-C_r)/C_u-[-b_0\cdot S+(a_0+a_1\cdot v_t)\cdot U]\cdot C_m/C_u \quad (4_4)$$

$$U_{f4}=U_{f3}=U_{f2}=S \quad (5_4)$$

Figure 14:
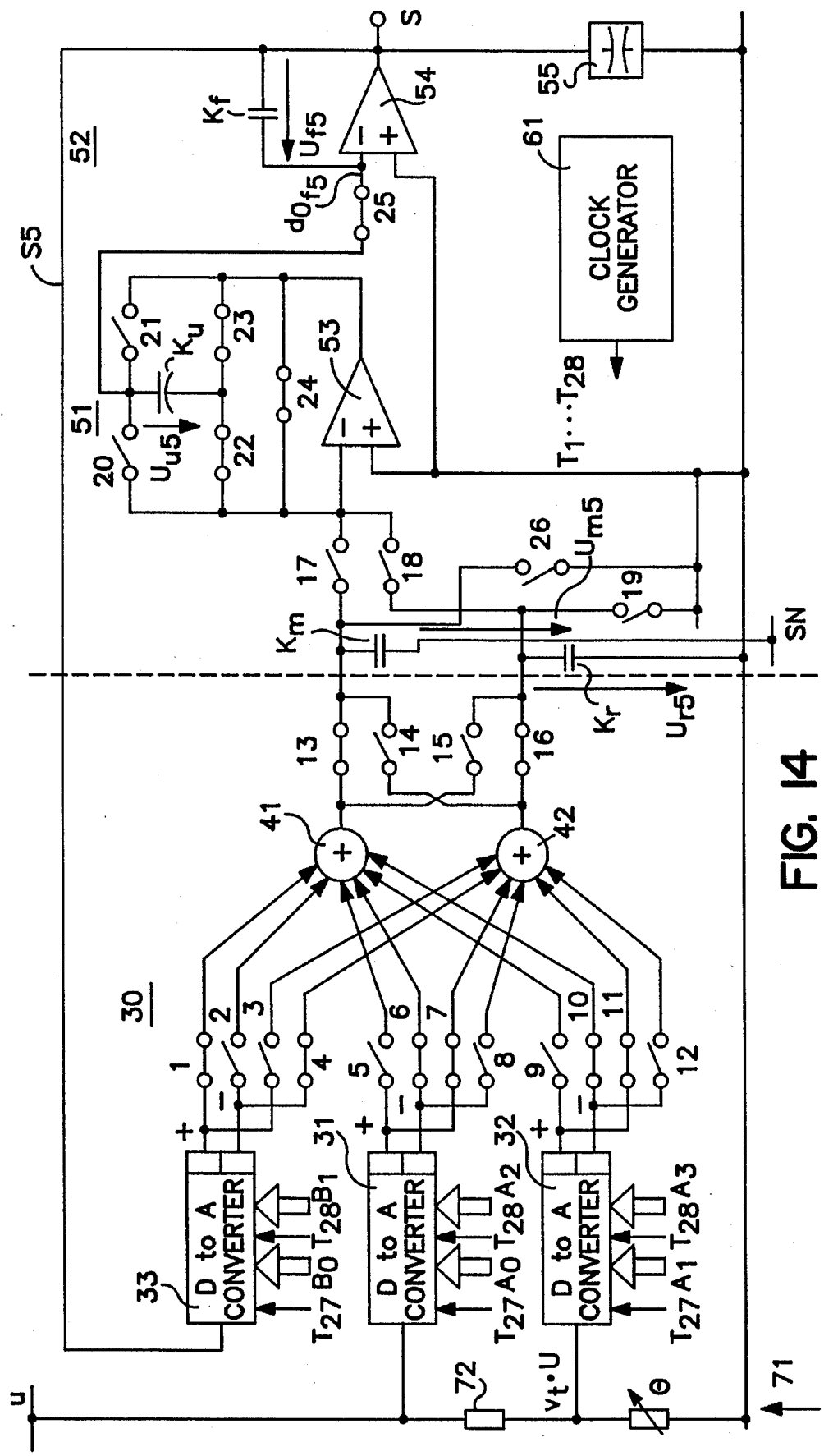
FIG. 14 shows the switch positions in the arrangement of FIG. 3 during period $D_5$ of FIG. 5.

The switch positions during period $D_5$ are shown in FIG. 14. Then the switches 1, 4, 6, 7, 10, 11, 13, 16, 22, 23, 24, 25 are closed. The adjusting circuit 30 thus feeds the capacitors $K_m$, $K_r$, but with voltages other than those shown in FIGS. 10 and 12. All other switches are open. As in FIG. 10, the clock signal $T_{28}$ causes the digital signals $A_2$, $A_3$, $B_1$ to be transferred into the three digital-to-analog converters 31, 32, 33, so that the analog signals $\pm a_2$, $\pm a_3$, $\pm b_1$ are provided at the respective converter outputs; however, the signals applied to the summers 41, 42 are not those of FIG. 10, but the corresponding inverse signals, namely the signals $-a_2$, $-a_3$, $+b_1$ to the summer 41 and the signals $+a_2$, $+a_3$, $-b_1$ to the summer 42.

Hence, the following equations hold:

$$U_{m5}=+b_1\cdot S-(a_2+a_3\cdot v_t)\cdot U \quad (1_5)$$

$$U_{r5}=-b_1\cdot S+(a_2+a_3\cdot v_t)\cdot U \quad (2_5)$$

$$\begin{aligned}dQ_{f5} &= (U_{u5}-U_{u4})\cdot C_u = \\ &= -[+b_1\cdot S-(a_2+a_3\cdot v_t)\cdot U]\cdot (C_m-C_r) \\ &\quad -[+b_0\cdot S-(a_0+a_1\cdot v_t)\cdot U]\cdot C_m \\ &= -k_1\cdot (C_m-C_r)-k_2\cdot C_m\end{aligned} \quad (3_5)$$

$$U_{u5}=0 \quad (4_5)$$

$$\begin{aligned}U_{f5} &= U_{f4}+dQ_{f5}/C_f \\ &= S-k_1\cdot (C_m-C_r)/C_f-k_2\cdot C_m/C_f\end{aligned} \quad (5_5)$$

The switch positions during period $D_6$ are shown in FIG. 15. Then the switches 17, 18, 20, 23 are closed. The adjusting circuit 30 is thus disconnected from the capacitors $K_m$, $K_r$, and the charges of the latter are transferred to the capacitor $K_u$, since all other switches are open and since the inverting input of the operational amplifier 53 is at virtual ground potential, i.e., at 0 V, so that during period $D_6$ the two terminals of each of the capacitors $K_m$, $K_r$ are also at 0 V.

Hence, the following equations hold:

$$dQ_{m6}=(U_{m6}-U_{m5})\cdot C_m=-[+b_1\cdot S-(a_2+a_3\cdot v_t)\cdot U]\cdot C_m \quad (1_6)$$

$$dQ_{r6}=(U_{r6}-U_{r5})\cdot C_r=-[-b_1\cdot S+(a_2+a_3\cdot v_t)\cdot U]\cdot C_r \quad (2_6)$$

$$\begin{aligned}dQ_6 &= dQ_{m6}+dQ_{r6}=-[+b_1\cdot S- \\ &\quad (a_2+a_3\cdot v_t)\cdot U](C_m-C_r) \\ &= -k_3\cdot (C_m-C_r)\end{aligned} \quad (3_6)$$

$$U_{u6}=U_{u5}-dQ_6/C_u=k_3\cdot (C_m-C_r)/C_u \quad (4_6)$$

$$U_{f6}=U_{f5}=S-k_1\cdot (C_m-C_r)/C_f-k_2\cdot C_m/C_f \quad (5_6)$$

The switch positions during period $D_7$ are shown in FIG. 16. Then the switches 1, 6, 10, 13, 15, 20, 23 are closed. The adjusting circuit 30 feeds the capacitors $K_m$, $K_r$, but with voltages other than those shown in FIG. 10. All other switches are open. The clock signal $T_{27}$ causes the digital signals $A_0$, $A_1$, $B_0$ to be transferred into the three digital-to-analog converters 31, 32, 33, so that the analog signals $\pm a_0$, $\pm a_1$, $\pm b_0$ are provided at the respective converter outputs. Thus, the signals $-a_0$, $-a_1$, $+b_0$ are applied to the summer 41, while the summer 42 receives no signals.

Hence, the following equations hold:

$$U_{m7}=k_2=+b_0\cdot S-(a_0+a_1\cdot v_t)\cdot U \quad (1_7)$$

$$U_{r7}=U_{m7}=k_2 \quad (2_7)$$

$$U_{u7}=U_{u6}=+k_3\cdot (C_m-C_r)/C_u \quad (4_7)$$

$$U_{f7}=U_{f6}=S-k_1\cdot (C_m-C_r)/C_f-k_2\cdot C_m/C_f \quad (5_7)$$

The switch positions during period $D_8$ are shown in FIG. 17. Then the switches 17, 19, 20, 23 are closed. The adjusting circuit 30 is thus disconnected from the capacitors $K_m$, $K_r$, and the capacitor $K_r$ is discharged to ground, so that only the charge of the capacitor $K_m$ is transferred to the capacitor $K_u$, since all other switches are open and since the inverting input of the operational amplifier 53 is at virtual ground potential, i.e., at 0 V, so that during period $D_8$ the terminals of the capacitor $K_m$ are also at 0 V.

Therefore, the following equations hold:

$$\begin{aligned}dQ_{m8} &= (U_{m8}-U_{m7})\cdot C_m=-[+b_0\cdot S- \\ &\quad (a_0+a_1\cdot v_t)\cdot U]\cdot C_m \\ &= -k_4\cdot C_m\end{aligned} \quad (1_8)$$

$$dQ_{r8}=U_{r8}=0 \quad (2_8)$$

$$dQ_8=dQ_{m8}=-k_4\cdot C_m \quad (3_8)$$

$$U_{u8}=U_{u7}-dQ_8/C_u=+k_3\cdot (C_m-C_r)/C_u+k_4\cdot C_m/C_u \quad (4_8)$$

$$U_{f8}=U_{f7}=S-k_1\cdot (C_m-C_r)/C_f-k_2\cdot C_m/C_f \quad (5_8)$$

A cycle is completed with the following period $D_9$, which corresponds to period $D_1$. The switch positions during period $D_9$ are shown in FIG. 18. Then, on the one hand, the switches 2, 3, 5, 8, 9, 12, 13, 16, 22, 23, 24, 25 are closed, as in FIG. 10, so that only the adjusting circuit 30 acts on the capacitors $K_m$, $K_r$, since the other switches, particularly switches 17, 18, 19, 26, are open. The clock signal $T_{28}$ causes the—possibly new—digital signals $A_2$, $A_3$, $B_1$ to be transferred into the three digital-to-analog converters 31, 32, 33, so that the analog signals $\pm a_2$, $\pm a_3$, $\pm b_1$ are provided at the respective converter outputs. Thus, the signals $+a_2$, $\pm a_3$, $-b_1$ are again transferred to the summer 41, and the signals $-a_2$, $-a_3$, $+b_1$ to the summer 42.

On the other hand, charges are transferred between the capacitors $K_u$, $K_f$ of the integrators 51, 52 and, since switches 17, 18 are open, do not act on the measuring and reference capacitors $K_m$, $K_r$.

Aside from the above Equations $(1_1)$ ... $(5_1)$, therefore, the following equations hold:

$$\begin{aligned}dQ_{f9} &= (U_{u9}-U_{u8})\cdot C_u \\ &= [-k_3\cdot (C_m-C_r)/C_u-k_4\cdot C_m/C_u]\cdot C_u\end{aligned} \quad (1_9)$$

$$U_{u9}=0 \quad (4_9)$$

$$\begin{aligned}U_{f9} &= U_{f8}+dQ_{f9}/C_f \\ &= S-(k_1+k_3)(C_m-C_r)/C_f-(k_2+k_4)C_m/C_f\end{aligned} \quad (5_9)$$

If i is the consecutive number of cycles of eight periods $D_1$ ... $D_8$, the following general relationship is true:

$$S_{8\cdot(i+1)+1}=S_{8\cdot i+1}-(k_1+k_3)(C_m-C_r)/C_f-(k_2+k_4))C_m/C_f \quad (6)$$

For i=0, for example, Equation (6) becomes:

$$S_9 = S_1 - (k_1+k_3)(C_m-C_r)/C_f - (k_2+k_4)C_m/C_f \quad (7)$$

If ideal operational amplifiers are assumed, the following equations hold in the steady state:

$$S_{8\cdot(i+1)+1} = S_{8\cdot i+1}; \ k_1 = k_3; \ k_2 = k_4.$$

Thus, the sum of the second and third terms on the right-hand side of Equation (6) must become zero:

$$2(Sb_1 - Ua_2 - Ua_3v_t)(C_m - C_r)/C_f + \quad (8)$$

$$2(Sb_0 - Ua_0 - Ua_1v_t)C_r/C_f = S(b_0 + b_1C_{v1}) -$$

$$U[a_0 + a_1v_t + (a_2 + a_3v_t)C_{V1}] = 0$$

$$S = U \cdot \frac{a_0 + a_1v_t + (a_2 + a_3v_t)C_{V1}}{b_0 + b_1C_{v1}}.$$

Equation (8) is identical with the relationship given in claim 1, which must be satisfied by the arrangement of the invention.

We claim:

1. A circuit arrangement for the linearization and temperature compensation of sensor signals from capacitive sensors which comprises:

a measuring capacitor;

a reference capacitor;

a clock generator;

a temperature-dependent voltage divider with a resistive temperature sensor connected between an operating potential and a first reference potential, particularly ground, and measuring the temperature of the measuring capacitor;

an adjusting circuit controlled by the clock generator for generating the output signal of the circuit arrangement, the adjusting circuit acting on the measuring capacitor and the reference capacitor by analog signals, the adjusting circuit having a first input connected to the operating potential, a second input connected to the temperature sensor, and a third input; and an integrating stage controlled by the clock generator and connected to the measuring capacitor and the reference capacitor the integrating stage having an output which is connected to the third input of the adjusting circuit and is the output of the circuit arrangement and the output of the circuit arrangement having an output signal, S, indicative of one of the linearized and temperature compensated sensor signals and obeying the following equation:

$$S = \frac{U \cdot \{a_0 + A_1 \cdot v_t + (a_2 + a_3 \cdot v_t) \cdot c_v\}}{b_0 + b_1 \cdot c_v},$$

where $C_v$ is one of the following capacitance ratios:

$C_{V1} = (C_m - C_r)/C_m$, $C_{V1} = (C_m - C_r)/(C_m + C_r)$, $C_{V3} = (C_m - C_r)/C_r$;

$C_m$ is the capacitance of the measuring capacitor;

$C_r$ is the capacitance of the reference capacitor;

U is the operating potential;

$a_0$ is a zero adjustment value;

$a_1$ is a temperature coefficient zero adjustment value;

$a_2$ is a first span adjustment value;

$a_3$ is a temperature coefficient span adjustment value;

$b_0$ is a second span adjustment value;

$b_1$ is a linearization adjustment value, and $v_1$ is the temperature-dependent resistance ratio of the voltage divider.

2. A circuit arrangement as claimed in claim 1 wherein the integrating stage comprises:

a first integrator with a capacitor having a polarity which is reversed by the clock generator, and a second integrator controlled by the clock generator and connected to the output of the first integrator.

3. A circuit arrangement as claimed in claim 2 wherein the adjusting circuit comprises:

a first digital-to-analog converter providing a positive converter signal and a negative converter signal, a reference input of said first digital-to-analog converter is the first input of the adjusting circuit, a first signal of said first digital-to-analog converter is supplied with the digitized zero adjustment value, $A_0$, a second signal input of said first digital-to-analog converter is supplied with the digitized first span adjustment value, $A_2$, and a first and a second signal enable input of said first digital-to-analog converter are controlled by the clock generator;

a second digital-to-analog converter providing a positive converter signal and a negative converter signal, a reference input of said second digital-to-analog converter is the second input of the adjusting circuit, a first signal input of said second digital-to-analog converter is supplied with the digitized temperature coefficient zero adjustment value, $A_1$, a second signal input of said second digital-to-analog converter is supplied with the digitized temperature coefficient span adjustment value, $A_3$, and a first and a second signal enable input of said second digital-to-analog converter are controlled by the clock generator;

a third digital-to-analog converter providing a positive converter signal and a negative converter signal, a reference input of said third digital-to-analog converter is the third input of the adjusting circuit, a first signal input of said third digital-to-analog converter is supplied with the digitized second span adjustment value, $B_0$, a second signal input of said third digital-to-analog converter is supplied with the digitized linearization adjustment value, $B_1$, and a first and second signal enable input of said third digital-to-analog converter are controlled by the clock generator;

a first summer and a second summer each having one output and six inputs, the first and second inputs of the first summer receiving, respectively, the positive and negative converter signals of the third digital-to-analog converter via a first switch and a second switch, the first and second inputs of the second summer receiving, respectively, the positive and negative converter signals of the third digital-to-analog converter via a third switch and a fourth switch, the third and fourth inputs of the first summer receiving, respectively, the positive and negative converter signals of the first digital-to-analog converter via a fifth switch and a sixth switch, the third and fourth inputs of the second summer receiving, respectively, the positive and negative converter signals of the first digital-to-analog converter via a seventh switch and an eighth switch, the fifth and sixth inputs of the second summer receiving, respectively, the positive and negative converter signals of the second digital-to-analog converter via a ninth switch and a tenth switch, and the fifth and sixth inputs of the second summer receiving, respectively, the positive and negative converter signals of the second digital-to-analog converter via an eleventh switch and a twelfth switch, with the output of the first summer and the output of the second summer connected via a 13th switch and a 14th switch, respectively, to the measuring capacitor, with the output of the first summer and the output of the second summer connected via a 15th switch and a 16th switch, respectively, to the reference capacitor, and with each terminal of the measuring capacitor and the reference capacitor remote from the switches connected to the first reference potential.

4. A circuit arrangement as claimed in claim 3 for the capacitance ratio $C_{V1}=(C_m-C_r)/C_m$ or $C_{V2}=(C_m-C_r)/(C_m+C_r)$ wherein the first integrator comprises:

a first operational amplifier, an inverting input of said first operational amplifier connected via a 17th switch to the measuring capacitor and via an 18th switch to the reference capacitor, with the junction of the 18th switch and the reference capacitor connected via a 19th switch to a second reference potential, a noninverting input of said first operational amplifier is also connected to the second reference potential, said inverting input is connected to the output via three parallel branches, the first of which consists of a 20th switch and a 21st switch in series, the second of which consists of a 22nd switch and a 23rd switch in series, and the third of which consists of a 24th switch, with the capacitor connected between the junction of the 20th and 21st switches and the junction of the 22nd and 23rd switches.

5. A circuit arrangement as claimed in claim 4 wherein the second integrator comprises:

a second operational amplifier, an inverting input of said second operational amplifier connected via a 25th switch to the junction of the 20th and 21st switches and via a fixed capacitor to the output of the arrangement, and a noninverting input of said second operational amplifier connected to the second reference potential.

6. A circuit arrangement as claimed in claim 5 for the capacitance ratio $C_{V3}=(C_m-C_r)/C_r$, comprising a 26th switch connected between the second reference potential and the junction of the 17th switch and the measuring capacitor.

7. A circuit arrangement as claimed in claim 1, comprising a smoothing capacitor connected to the output of the integrating stage.

8. A circuit arrangement as claimed in claim 6 wherein to control the first to the 26th switches and the respective signal enable inputs of the three digital-to-analog converters, the clock generator generates, from a basic clock signal, clock signals having a positive level and a negative level, the respective level occurring during at least one eighth of the period of the basic clock signal.

9. A circuit arrangement as claimed in claim 1, wherein the adjusting circuit comprises a first digital-to-analog converter providing a positive converter signal and a negative converter signal, a reference input of said first digital-to-analog converter is the first input of the adjusting circuit, a first signal of said first digital-to-analog converter is supplied with the digitized zero adjustment value, $A_0$, a second signal input of said first digital-to-analog converter is supplied with the digitized first span adjustment value, $A_2$, and a first and a second signal enable input of said first digital-to-analog converter are controlled by the clock generator;

a second digital-to-analog converter providing a positive converter signal and a negative converter signal, a reference input of said second digital-to-analog converter is the second input of the adjusting circuit, a first signal input of said second digital-to-analog converter is supplied with the digitized temperature coefficient zero adjustment value, $A_1$, a second signal input of said second digital-to-analog converter is supplied with the digitized temperature coefficient span adjustment value, $A_3$, and a first and second signal enable input of said second digital-to-analog converter are controlled by the clock generator;

a third digital-to-analog converter providing a positive converter signal and a negative converter signal, a reference input of said third digital-to-analog converter is the third input of the adjusting circuit, a first signal input of said third digital-to-analog converter is supplied with the digitized second span adjustment value, $B_0$, a second signal input of said third digital-to-analog converter is supplied with the digitized linearization adjustment value, $B_1$, and a first and a second signal enable input of said third digital-to-analog converter are controlled by the clock generator;

a first summer and a second summer each having one output and six inputs, the first and second inputs of the first summer receiving, respectively, the positive and negative converter signals of the third digital-to-analog converter via a first switch and a second switch, the first and second inputs of the second summer receiving, respectively, the positive and negative converter signals of the third digital-to-analog converter via a third switch and a fourth switch, the third and fourth inputs of the first summer receiving, respectively, the positive and negative converter signals of the first digital-to-analog converter via a fifth switch and a sixth switch, the third and fourth inputs of the second summer receiving, respectively, the positive and negative converter signals of the first digital-to-analog converter via a seventh switch and an eighth switch, the fifth and sixth inputs of the second summer receiving, respectively, the positive and negative converter signals of the second digital-to-analog converter via a ninth switch and a tenth switch, and the fifth and sixth inputs of the second summer receiving, respectively, the positive and negative converter signals of the second digital-to-analog converter via an eleventh switch and a twelfth switch, with the output of the first summer and the output of the second summer connected via a 13th switch and a th switch, respectively, to the measuring capacitor, with the output of the first summer and the output of the second summer connected via a 15th switch and a th switch, respectively, to the reference capacitor, and with each terminal of the measuring capacitor and the reference capacitor remote from the switches connected to the first reference potential.

10. A circuit arrangement as claimed in claim 2 for the capacitance ratio $C_{V1}=(C_m-C_r)/C_m$ or $C_{V2}=(C_m-C_r)/(C_m+C_r)$, wherein the first integrator comprises:

a first operational amplifier, an inverting input of said first operational amplifier is connected via a 17th switch to the measuring capacitor and via an 18th switch to the reference capacitor, with the junction of the 18th switch and the reference capacitor connected via a 19th switch to a second reference potential, a noninverting input of said first operational amplifier is also connected to the second reference potential, said inverting input is connected to the output via three parallel branches, the first of which consists of a 20th switch and a 21st switch in series, the second of which consists of a 22nd switch and a 23rd switch in series, and the third of which consists of a 24th switch, with the capacitor connected between the junction of the 20th and 21st switches and the junction of the 22nd and 23rd switches.

11. A circuit arrangement as claimed in claim 2, wherein the second integrator comprises:

a second operational amplifier, an inverting input of said second operational amplifier is connected via a 25th switch to the junction of the 20th and 21st switches and via a fixed capacitor to the output of the arrangement, and a noninverting input of said second operational amplifier is connected to a second reference potential.

12. A circuit arrangement as claimed in claim 4 for the capacitance ratio $C_{V3}=(C_m-C_r)/C_r$, comprising a 26th switch connected between the second reference potential and the junction of the 17th switch and the measuring capacitor.

* * * * *